(12) United States Patent
Hamada

(10) Patent No.: US 7,184,639 B2
(45) Date of Patent: Feb. 27, 2007

(54) SLAB WAVEGUIDE AND METHOD OF MANUFACTURING THE SLAB WAVEGUIDE

(75) Inventor: Hidenobu Hamada, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 155 days.

(21) Appl. No.: 10/648,905

(22) Filed: Aug. 27, 2003

(65) Prior Publication Data

US 2005/0100297 A1 May 12, 2005

(30) Foreign Application Priority Data

Aug. 28, 2002 (JP) .............................. 2002-249691

(51) Int. Cl.
*G02B 6/10* (2006.01)

(52) U.S. Cl. ..................................... 385/129
(58) Field of Classification Search ........ 385/129–132, 385/37, 39
See application file for complete search history.

(56) References Cited

U.S. PATENT DOCUMENTS

| | | | |
|---|---|---|---|
| 4,025,157 A | 5/1977 | Martin | |
| 4,657,344 A | 4/1987 | Bohm | |
| 5,389,943 A | 2/1995 | Joannopoulos et al. | |
| 5,987,208 A * | 11/1999 | Gruning et al. | 385/146 |
| 6,542,682 B2 * | 4/2003 | Cotteverte et al. | 385/125 |

FOREIGN PATENT DOCUMENTS

| | | |
|---|---|---|
| JP | 2001-337236 | 12/2001 |
| WO | WO 02/063347 A | 8/2002 |
| WO | WO 02/091051 A | 11/2002 |

OTHER PUBLICATIONS

European Search Report for EP 03 01 9006, dated Nov. 16, 2004.
Roberts, et al., "Guided mode analysis, and fabrication of a 2-dimensional visible photonic band structure confined within a planar semiconductor waveguide", Materials Science and Engineering B, Elsevier Sequoia, Lausanne, CH, vol. 49, No. 2, Sep. 19, 1997, pp. 155-165.
Beltrami, et al., "Planar Graded-Index (GRIN) PECVD Lens", Electronics Letters, IEE Stevenage, GB, vol. 32, No. 6, Mar. 14, 1996, pp. 549-550.
Baba, et al., "Strong enhancement of light extraction efficiency in GaInAsP 2-D-arranged microcolumns", Journal of Lightwave Technology IEEE USA, vol. 17, No. 11, Nov. 1999, pp. 2113-2120.

(Continued)

*Primary Examiner*—Sarah Song
(74) *Attorney, Agent, or Firm*—RatnerPrestia

(57) ABSTRACT

A slab-type photonic crystal arranged to reduce the coupling loss in coupling to an optical fiber and to satisfy single-mode conditions. The photonic crystal has a slab having a plurality of slab refractive index portions and vacancies formed between the slab refractive index portions. The number, shape, size and refractive index of the slab refractive index portions and the number and shape of the vacancies are selected so that when a beam of light entering the waveguide expands to a maximum extent, the size of the beam in the slab thickness direction does not exceed the slab thickness.

10 Claims, 21 Drawing Sheets

OTHER PUBLICATIONS

Johnson, et al., "Guided Modes in Photonic Crystal Slabs", Physical Review, B. Condensed Matter, American Institute of Physics, New York, US, vol. 60, No. 8, Aug. 15, 1999, pp. 5751-5758.

Weisbuch, et al., "3D Control of Light in Waveguide-Based Two-Dimensional Photonic Crystals", IEICE Transactions on Electronics, Institute of Electronics Information and Comm. Eng. Tokyo, JP, vol. E84-C, No. 5, May 2001, pp. 660-668.

Kraus, et al., "Photonic Crystals in the Optical Regime—Past, Present and Future", Progress in Quantum Electronics, Pergamon Press, Oxford, GB, vol. 23, No. 2, 1999, pp. 51-96.

* cited by examiner

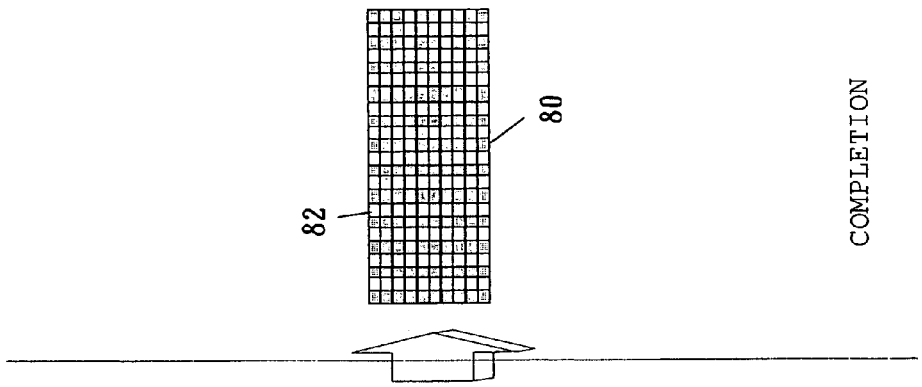
Fig. 9 (c) COMPLETION
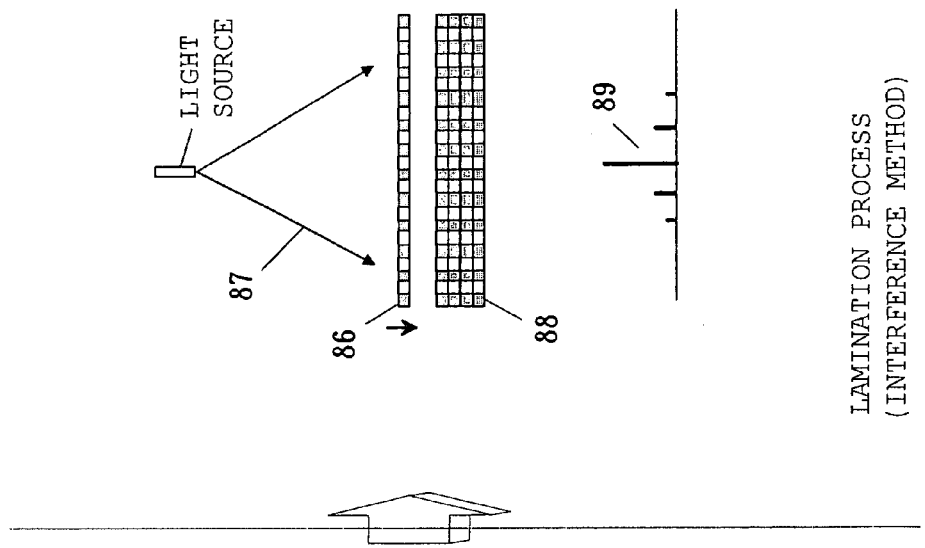
Fig. 9 (b) LAMINATION PROCESS (INTERFERENCE METHOD)
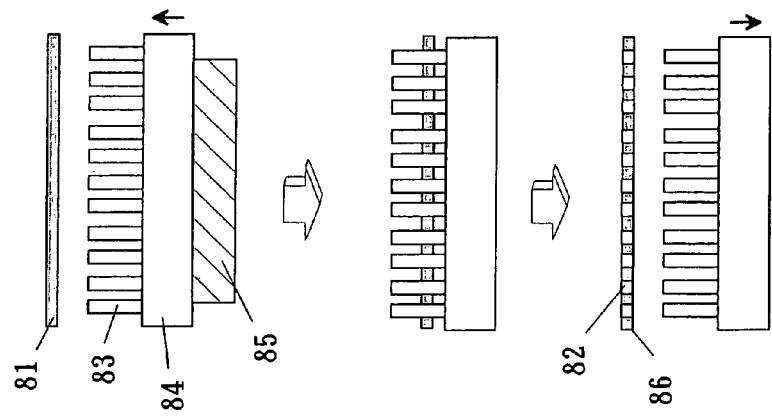
Fig. 9 (a) VACANCY FORMING PROCESS

COMPLETION

LAMINATION PROCESS
(ALIGNMENT METHOD)

VACANCY FORMING PROCESS

REFRACTIVE INDEX DISTRIBUTED FILM MAKING PROCESS

VACANCY FORMING PROCESS

Fig. 14
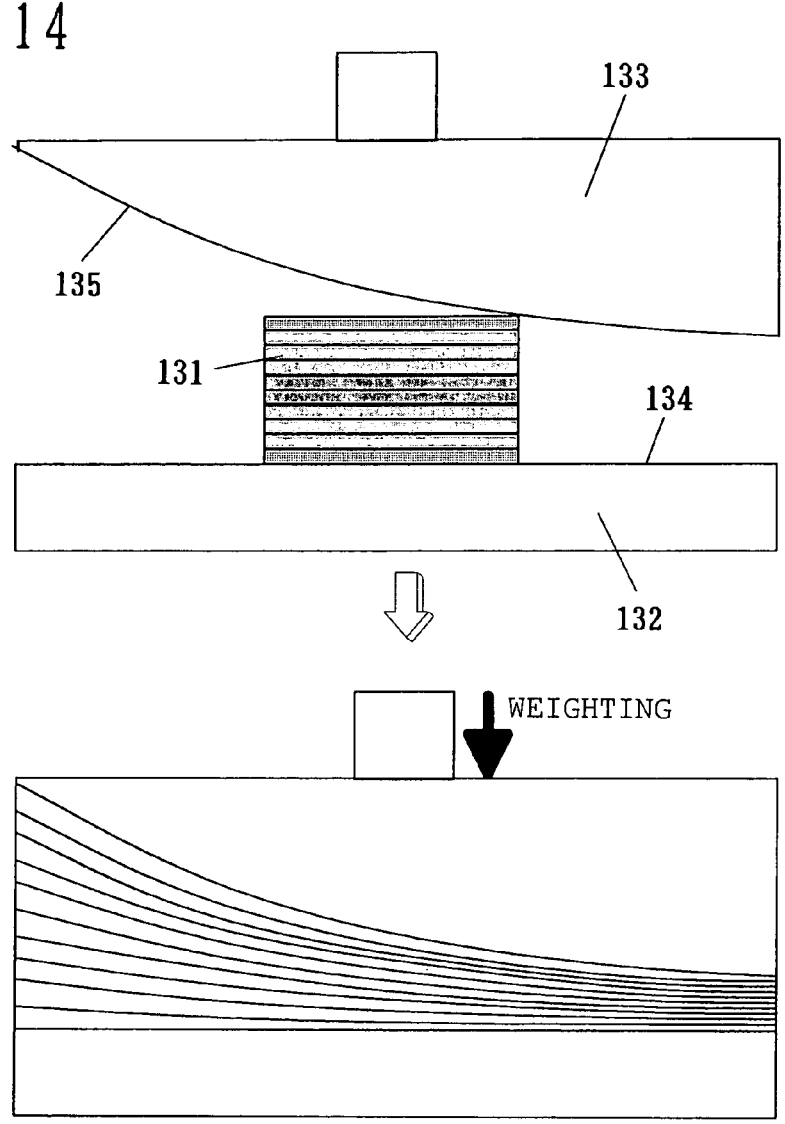
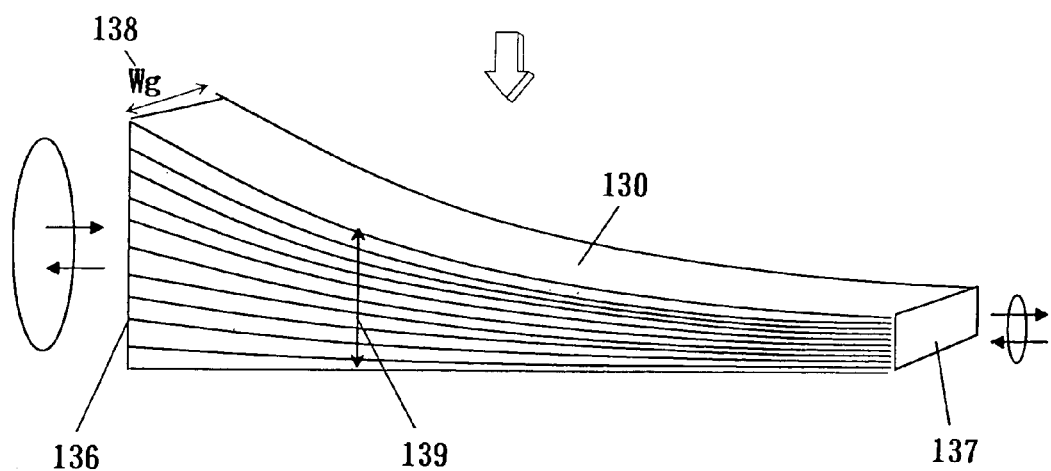

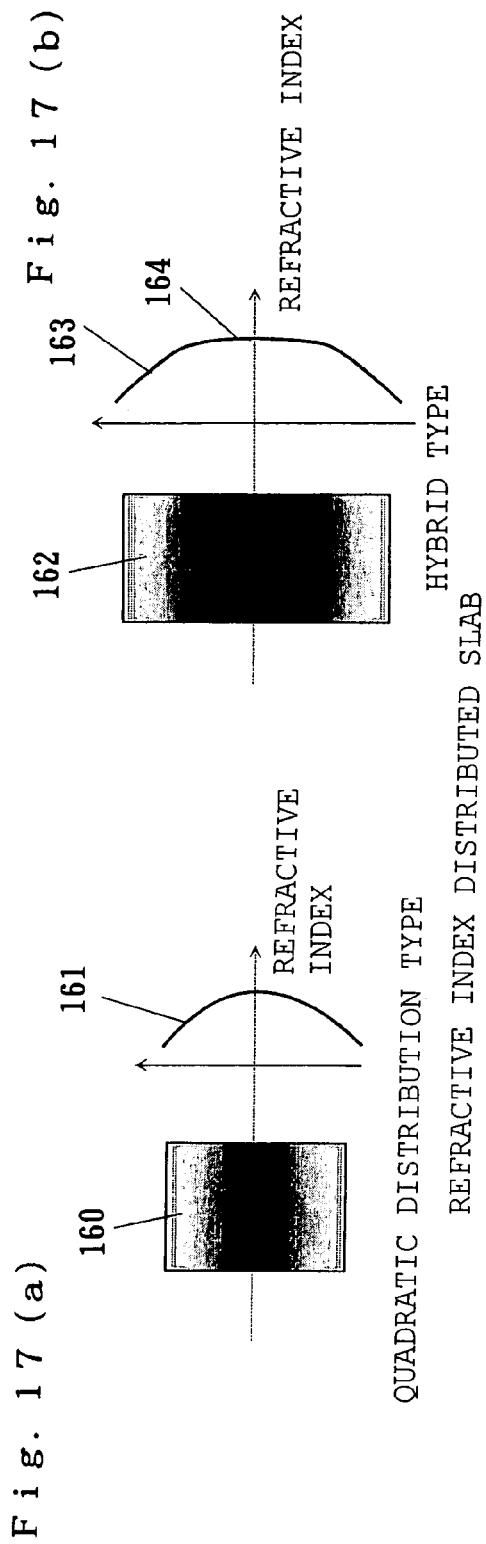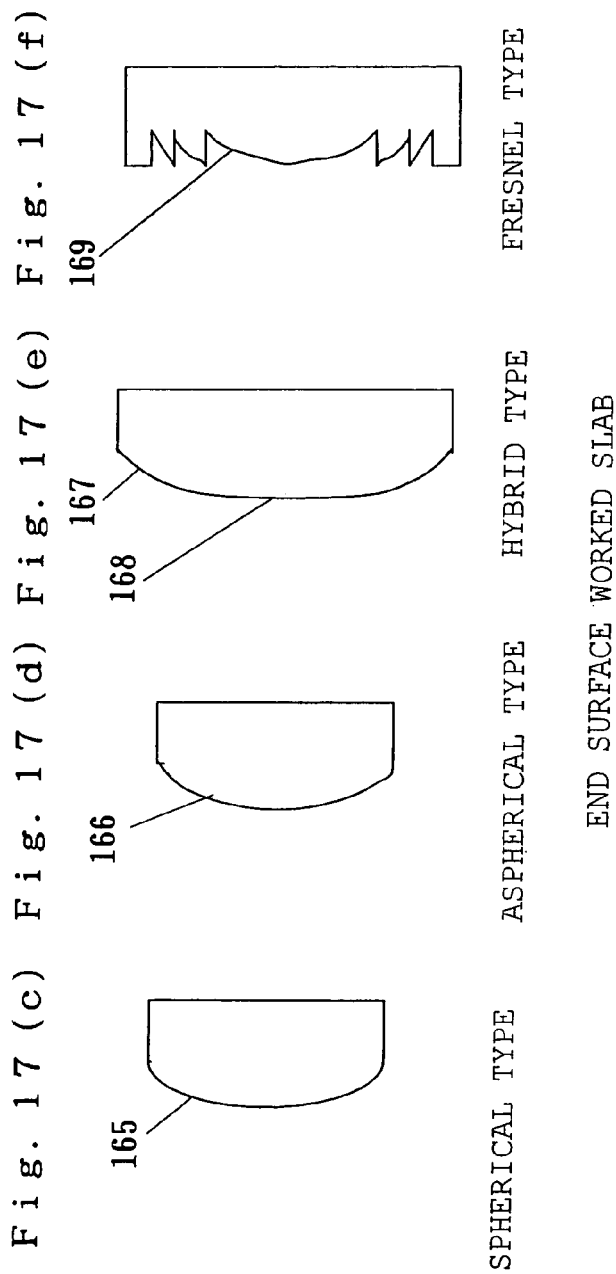
Fig. 17(a) QUADRATIC DISTRIBUTION TYPE
Fig. 17(b) HYBRID TYPE
REFRACTIVE INDEX DISTRIBUTED SLAB
Fig. 17(c) SPHERICAL TYPE
Fig. 17(d) ASPHERICAL TYPE
Fig. 17(e) HYBRID TYPE
Fig. 17(f) FRESNEL TYPE
END SURFACE WORKED SLAB

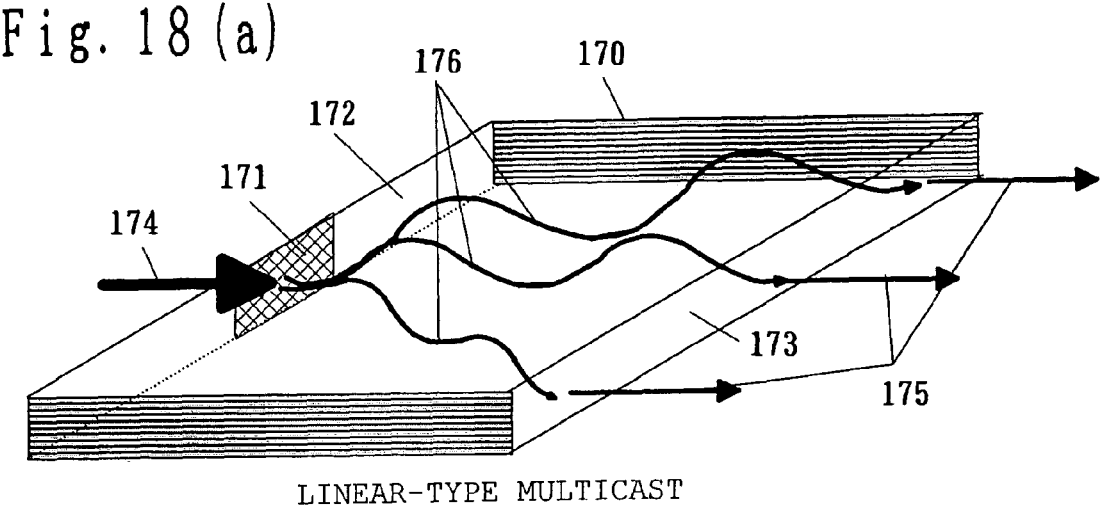
LINEAR-TYPE MULTICAST
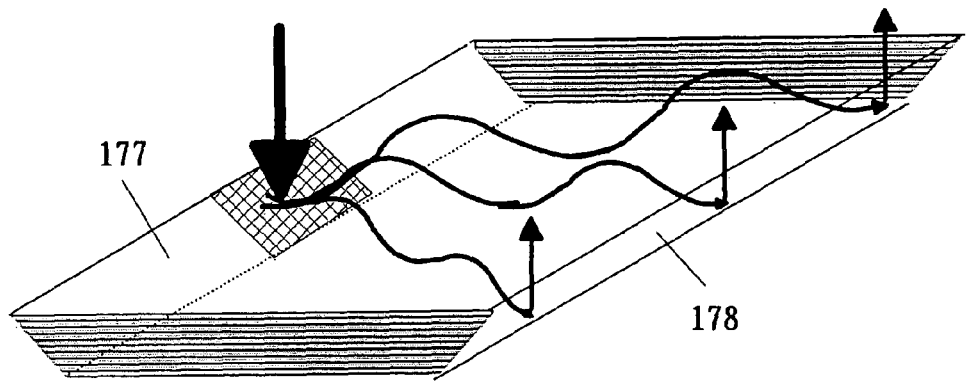
REFLECTION-TYPE MULTICAST
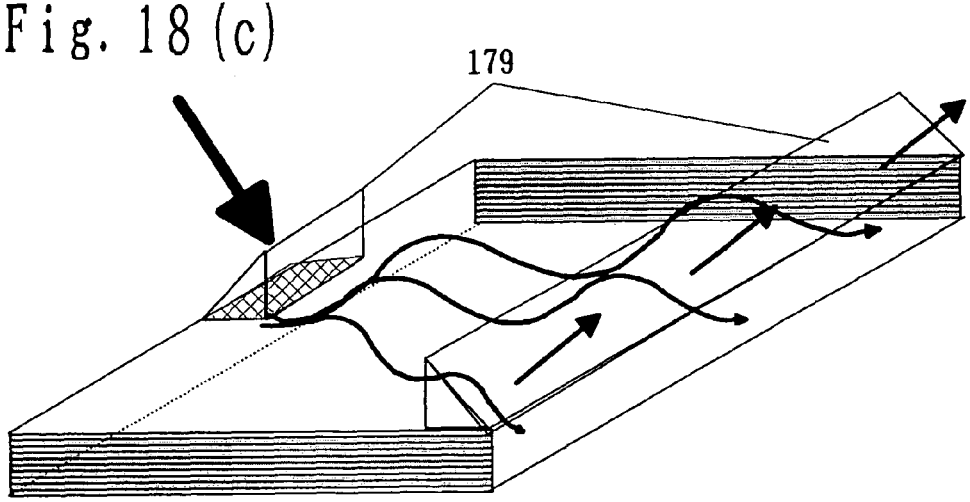
COUPLER-TYPE MULTICAST

MULTILAYER SLAB WAVEGUIDE

HYBRID WAVEGUIDE

PLACEMENT OF MASK

TRACKING PROCESS

ETCHING PROCESS

Fig. 21 (a) PRIOR ART
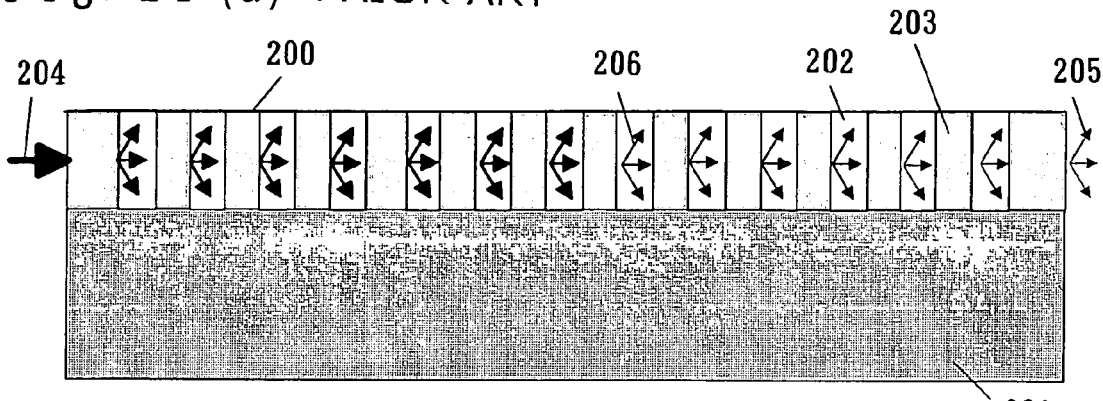
Fig. 21 (b) PRIOR ART
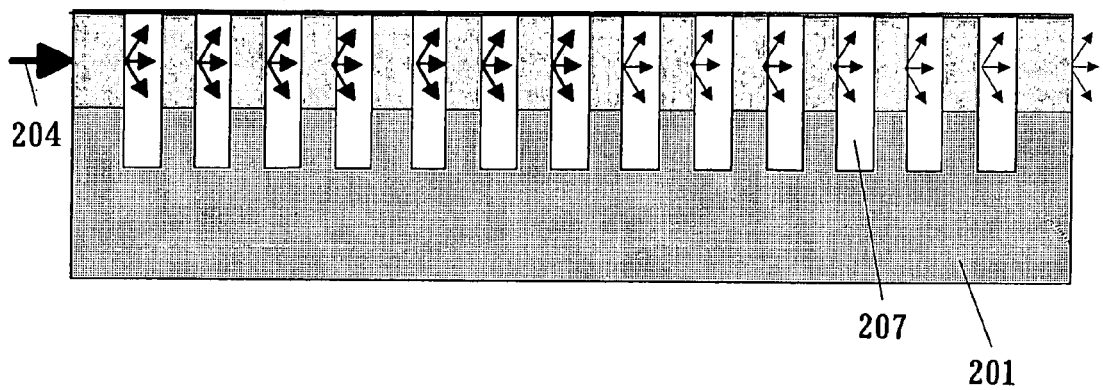
Fig. 21 (c) PRIOR ART
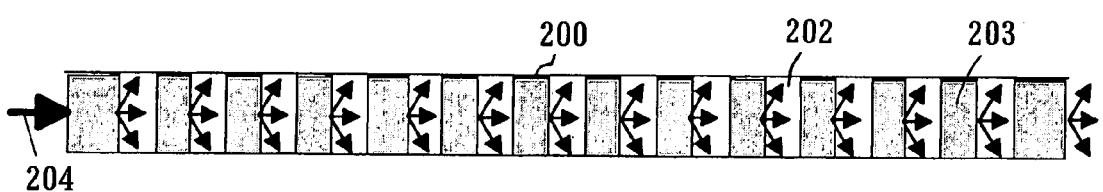
Fig. 21 (d) PRIOR ART
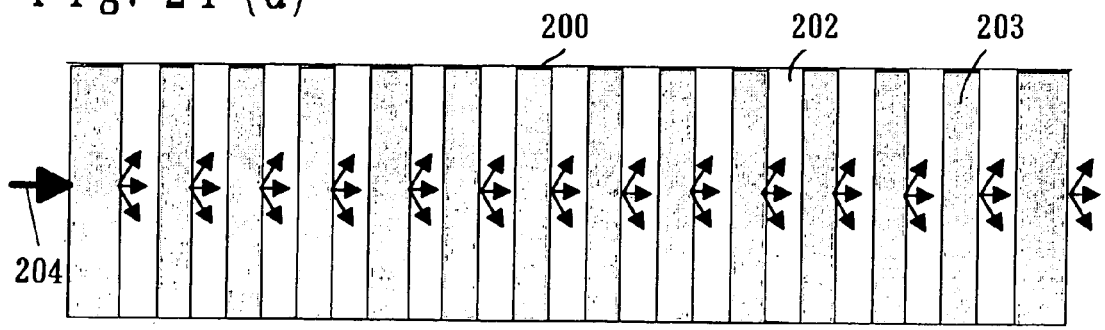

SLAB WAVEGUIDE AND METHOD OF MANUFACTURING THE SLAB WAVEGUIDE

BACKGROUND OF THE INVENTION

1. Field of the Invention

The present invention relates to a slab waveguide comprising a photonic crystal, having a refractive index distribution in the film thickness direction, and used in an optical planar circuit. The present invention also relates to a method of manufacturing the slab waveguide.

2. Related Art of the Invention

FIGS. 21(a) and 21(b) show slab waveguides with a substrate, which are examples of a first conventional slab waveguide, and each of which is constituted by a photonic crystal.

The slab waveguide shown in FIG. 21(a) has a substrate 201 and a slab-type photonic crystal 200 forming a slab 203 on the substrate 201. Cylindrical vacancies 202 are formed in the slab 203. The vacancies 202 extend in the thickness direction of the slab 203 and are two-dimensionally and periodically arranged parallel to the substrate 201. The slab 203 is uniform in refractive index. The refractive index of the slab 203 is larger than that of the substrate 201. The thus-formed slab-type photonic crystal 200 used as a slab waveguide is capable of reducing the speed of light propagating in the slab waveguide, dispersing the wavelength of light, or deflecting the direction of traveling of light.

Propagation of light in a photonic crystal has been known by using as the refractive index of a photonic crystal the effective refractive index defined as the volumetric ratio of the refractive indices of a plurality of materials periodically arranged. Such macroscopic use is effective in a case where the refractive index period is sufficiently smaller than the wavelength of light, because light behaves according to the average of refractive indices. In a case where the refractive index period is close to the wavelength of light, however, light behaves according to each of refractive indices and, therefore, it is necessary to make microscopic use such as to treat each of different refractive index materials periodically arranged.

Actually, in a macroscopic use, it is contemplated that if a substrate 201 having a refractive index lower than the effective refractive index obtained by averaging the refractive index of vacancies 202 and the refractive index of the slab 203 is used, light propagates through the above-described slab-type photonic crystal 200. However, according to a microscopic use, light 204 incident upon the slab-type photonic crystal 200 in the slab waveguide with such a substrate propagates through a slab 203 portion periodically formed and having a refractive index higher than that of the substrate 201, but diffused light 206 in the vacancy portions 202 leaks to the substrate 201 side because the reflective index of the vacancies 202 is lower than that of substrate 201, and only part of diffused light 206 can propagates through the vacancies 202. In this case, the amount of light 205 emergent from the above-described slab-type photonic crystal 200 is substantially zero.

Also in the case of a slab waveguide with a substrate in which, as shown in FIG. 21(b), substrate vacancies 207 are provided by extending the vacancies 202 in the substrate 201 to reduce the effective refractive index of the substrate 201 portion, light does not propagate through the slab-type photonic crystal 200.

FIGS. 21(c) and 21(d) show slab waveguides with no substrate, which are examples of a second conventional slab waveguide, and each of which is constituted by a photonic crystal.

Each of the slab waveguides shown in FIGS. 21(a) and 21(b) comprises a slab-type photonic crystal 200. The slab-type photonic crystals 200 of these slab waveguides are formed in the same manner except that they differ in thickness from each other. In each slab-type photonic crystals 200, cylindrical vacancies 202 are formed. The vacancies 202 extend in the thickness direction of the slab 203 and are two-dimensionally and periodically arranged parallel to the major surfaces of the slab 203. The slab 203 is uniform in refractive index.

In a case where a slab waveguide comprising only the above-described slab photonic crystal 200 with no substrate, the slab photonic crystal 200 behaves like a lens waveguide, slab portions having a higher refractive index act as a lens, and leakage by diffusion does not occur in the vacancies 202 having a lower refractive index. As a result, incident light 204 propagates in the slab-type photonic crystal 200 without diffusing.

If different film thicknesses such as shown in FIGS. 21(c) and 21(d) are set, different states of propagation of light are exhibited. In a case where the film thickness shown in FIG. 21(c) is about several microns or less, light is reflected at the boundary in the slab thickness direction between air and the slab 203 portion having a higher refractive index so as to propagate in a light multimode propagation manner. To satisfy single-mode conditions, therefore, it is necessary to set the slab thickness to 1 μm or less. In this case, there is no problem with propagation in the slab-type photonic crystal 200, but the coupling loss in coupling to an optical fiber having a core diameter of about 8 μm is large because of a difference in mode field diameter from the optical fiber.

On the other hand, in a case where the film thickness shown in FIG. 21(d) is large, about 10 μm, light is not reflected at the boundary in the slab thickness direction between air and the slab 203 portion having a higher refractive index. In this case, therefore, the slab waveguide is formed as an ideal lens waveguide and the propagation of light is single-mode propagation. Also, since there is no difference in mode field from the optical fiber, the coupling loss in coupling to the optical fiber is small. In this case, however, it is necessary to make vacancies having a period close to that of light with respect to a film thickness of 10 μm or more, i.e., an aspect ratio of 50 or more. At the present time, it is extremely difficult to realize such a high aspect ratio.

In either of the cases shown in FIGS. 21(c) and 21(d), there is a need to reinforce the slab by some means in putting the slab waveguide to practical use and there is also a need to achieve a device design by considering use of a member corresponding to a substrate.

The invention disclosed in Japanese Patent Laid-open No. 2001-337236 is equivalent to an arrangement in which the vacancies 202 shown in FIG. 21(a) are filled with a material having a refractive index lower than that of the slab 203, and in which the upper clad layer in an upper portion of the slab and a lower clad layer (substrate) 201 are formed of a material having a refractive index lower than that of the material filling the vacancies. In this arrangement, light is totally reflected at the clad layer boundary as seen from a microscopic viewpoint and, accordingly, light is guided through the slab. In actuality, however, no material having a refractive index as low as that of air exists. Therefore, it is not possible to set between the slab and vacancies a refractive index difference sufficient for enabling the photonic crystal to operate sufficiently effectively.

In the case of slab-type photonic crystals such as those in the above-described conventional arts in which vacancies are periodically formed in a slab uniform in refractive index, it is difficult to satisfy all of conditions (1) to (3) shown below.

(1) The mode field diameter is close to that of an optical fiber.
(2) Single-mode conditions are satisfied, as are those in the case of an ideal lens waveguide.
(3) The slab waveguide has a strength such as to be capable of being put to practical use.

In the arrangements according to conventional methods, the refractive index of the substrate is higher than that of the vacancies in the photonic crystal and, therefore, leakage of light from the vacancies occurs and light cannot propagate. The arrangement using no substrate and free from leakage of light entails, for satisfaction of single-mode conditions, the need to set the film thickness of the slab to a small value of 1 µm or less or to an increased value of 10 µm or greater. If the film thickness of the slab is reduced, coupling to an optical fiber is difficult. If the film thickness of the slab is increased, it is difficult to fabricate the slab waveguide. Moreover, the strength of the slab in a single state is so low that the slab waveguide is incapable of being put to practical use.

SUMMARY OF THE INVENTION

The $1^{st}$ aspect of the present invention is a slab waveguide comprising a two-dimensional crystal grating having columnar members having a refractive index different from the refractive index of a slab and two-dimensionally and periodically arranged along a surface of the slab, wherein the refractive index of a slab refractive index portion other than said columnar members in the slab, the number, the shape and the refractive index of said columnar members in the slab are selected so that when a beam of light entering the slab waveguide expands to a maximum extent, the size of the beam in the slab thickness direction does not exceed the slab thickness.

The $2^{nd}$ aspect of the present invention is the slab waveguide according to the $1^{st}$ aspect of the present invention, wherein the refractive index of said slab refractive index portion in a direction perpendicular to the slab surface is maximized at a predetermined portion other than end portions in the slab refractive index portion, and is not increased with the increase in distance from the predetermined portion.

The $3^{rd}$ aspect of the present invention is the slab waveguide according to the $2^{nd}$ aspect of the present invention, wherein the refractive index of said slab refractive index portion in the direction perpendicular to the slab surface is distributed symmetrically about the predetermined portion.

The $4^{th}$ aspect of the present invention is the slab waveguide according to the $3^{rd}$ aspect of the present invention, wherein the refractive index of said slab refractive index portion in the direction perpendicular to the slab surface is reduced in accordance with a quadratic function or a approximately quadratic function of the distance from the predetermined portion.

The $5^{th}$ aspect of the present invention is the slab waveguide according to the $3^{rd}$ aspect of the present invention, wherein the predetermined portion is a region of a predetermined length other than the end portions in said slab refractive index portion, and the refractive index of said slab refractive index portion in the direction perpendicular to the slab surface is substantially constant in the region having the predetermined length other than the end portions in said slab refractive index portion and is reduced in accordance with a quadratic function or a approximately quadratic function of the distance from an end of the region having the predetermined length.

The $6^{th}$ aspect of the present invention is the slab waveguide according to the $4^{th}$ or the $5^{th}$ aspects of the present invention, wherein a refractive index distribution constant relating to the refractive index of the portion in which the refractive index is reduced in accordance with the quadratic function or the approximately quadratic function of the distance is 1 mm$^{-1}$ or greater.

The $7^{th}$ aspect of the present invention is the slab waveguide according to the $4^{th}$ or the $5^{th}$ aspects of the present invention, wherein a refractive index distribution constant relating to the refractive index of the portion in which the refractive index is reduced in accordance with the quadratic function or the approximately quadratic function of the distance is such a value that the total optical path length is defined by an optical integer multiple pitch of 0.5.

The $8^{th}$ aspect of the present invention is the slab waveguide according to the $4^{th}$ or the $5^{th}$ aspects of the present invention, wherein a refractive index distribution constant relating to the refractive index of the portion in which the refractive index is reduced in accordance with the quadratic function or the approximately quadratic function of the distance is such a value that the sum of an incidence-side focal distance and an emergence-side focal distance of said slab refractive index portion is equal to the length of a constituent unit formed by said slab refractive index portion and said columnar members.

The $9^{th}$ aspect of the present invention is the slab waveguide according to the $1^{st}$ aspect of the present invention, wherein at least one of boundary surfaces between said slab refractive index portion and said columnar members has a curved surface.

The $10^{th}$ aspect of the present invention is the slab waveguide according to the $9^{th}$ aspect of the present invention, wherein the boundary surface between said slab refractive index portion and said columnar members has a curved surface in the thickness direction of the slab.

The $11^{th}$ aspect of the present invention is the slab waveguide according to the $9^{th}$ aspect of the present invention, wherein the boundary surface between said slab refractive index portion and said columnar members has a flat surface in a region having a predetermined length other than end portions in said slab refractive index portion, and has curved surfaces in the film thickness direction of the slab outside the region having a predetermined length.

The $12^{th}$ aspect of the present invention is the slab waveguide according to the $10^{th}$ or the $11^{th}$ aspects of the present invention, wherein the radius of curvature of the curved surface is such a value that the sum of an incidence-side focal distance and an emergence-side focal distance of said slab refractive index portion is equal to the length of a constituent unit formed by said slab refractive index portion and said columnar members.

The $13^{th}$ aspect of the present invention is the slab waveguide according to the $12^{th}$ aspect of the present invention, wherein the radius of curvature of the curved surface is such a value that the sum of an incidence-side focal distance and an emergence-side focal distance of said slab refractive index portion are equal to each other.

The 14th aspect of the present invention is the slab waveguide according to the 10th or the 11th aspects of the present invention, wherein the radius of curvature of the curved surface is 0.1 μm or greater.

The 15th aspect of the present invention is a method of manufacturing a slab waveguide, comprising a lamination step of forming a laminate by laminating a plurality of films differing in refractive index from each other and each having holes formed therein, while aligning the holes of the films, wherein a film portion of the laminate functions as a slab, and each of portions corresponding to the holes in the films functions as a columnar member.

The 16th aspect of the present invention is the method of manufacturing a slab waveguide according to the 15th aspect of the present invention, wherein one of the films having the highest refractive index is placed at a position other than end portions of the laminate, and the other films are successively laminated outwardly from the position of the film having the highest refractive index in decreasing order of refractive index.

The 17th aspect of the present invention is the method of manufacturing a slab waveguide according to the 15th aspect of the present invention, wherein said lamination step includes irradiating a surface of each of the plurality of films with single-wavelength light applied perpendicular to the surface of the film when the film is laminated on the laminate, and aligning the position of the holes of the films in the film thickness direction by positioning the laminated film on the basis of interference light from the laminate.

The 18th aspect of the present invention is a method of manufacturing a slab waveguide, comprising:

a lamination step of forming a laminate by laminating a plurality of films differing in refractive index from each other; and a columnar member forming step of forming holes in the laminate formed in said lamination step, wherein a film portion of the laminate functions as a slab, and each of portions corresponding to the holes in the films functions as a columnar member.

The 19th aspect of the present invention is the method of manufacturing a slab waveguide according to the 18th aspect of the present invention, wherein said lamination step includes:

a thick film laminate forming step of forming a refractive index distributed thick film laminate by laminating thick films differing in refractive index from each other in such a manner that the refractive index is maximized in a portion other than end portions of the laminate; and a pressing step of pressing the refractive index distributed thick film laminate in the direction of lamination until the thickness of the refractive index distributed thick film laminate becomes equal to a desired thickness.

The 20th aspect of the present invention is the method of manufacturing a slab waveguide according to the 19th aspect of the present invention, wherein, in said pressing step, the refractive index distributed thick film laminate is weighted down by being pinched between two members having surfaces which are not parallel to each other at least in a restricted region.

The 21st aspect of the present invention is the method of manufacturing a slab waveguide according to the 20th aspect of the present invention, wherein said two members comprise for practical use, and a method of manufacturing the slab waveguide.

To achieve the above-described object, according to the present invention, there is provided a slab-type photonic crystal having a two-dimensional crystal grating having vacancies formed in a slab in the film thickness direction of the slab and two-dimensionally and periodically arranged, and constituted by a slab refractive index portion and columnar member portions, wherein the slab refractive index portion includes a maximum-refractive-index portion having the maximum refractive index in a certain region within the film thickness of the slab and a lower-refractive-index portion in which the refractive index is reduced according to a quadratic function of the distance from the maximum-refractive-index portion, and wherein a refractive index distribution constant relating to the lower-refractive-index portion is about 1 mm$^{-1}$ or greater.

If the slab-type photonic crystal having quandratically distributed variation in refractive index in the film thickness direction such that the refractive index distribution constant is about 1 mm$^{-1}$ or greater is used, light can propagate through the slab-type photonic crystal without leaking from the same regardless of the film thickness of the slab-type photonic crystal even if the photonic crystal is combined with a substrate. Also, single-mode conditions can be satisfied and the film thickness can be set so as to match the mode field diameter of an optical fiber.

The 22nd aspect of the present invention ia a method of manufacturing a slab waveguide, comprising:

a refractive index distribution forming step of forming a refractive index distribution in a film-like slab blank by causing ions to move into and out of the film-like slab blank through upper and lower surfaces of the film-like slab blank; and a columnar member forming step of forming holes in the film-like slab blank in which the refractive index distribution is formed, wherein a portion of the film-like slab blank functions as a slab, and each of portions corresponding to the holes functions as a columnar member.

In view of the above-described problems of the conventional slab waveguides, an object of the present invention is to provide a slab waveguide constituted by a slab-type photonic crystal, having a mode field diameter close to that of an optical fiber, satisfying single-mode conditions like an ideal lens waveguide, and having a strength high enough the film thickness can be set so as to match the mode field diameter of an optical fiber.

Methods of fabricating a slab-type photonic crystal having a refractive index distribution in the film thickness direction are roughly grouped into the following two methods.

(1) A plurality of films differing in refractive index from each other are laminated to make a slab waveguide having a refractive index distribution, and vacancies to be two-dimensionally and periodically arranged are formed in the film thickness direction.

(2) Vacancies are formed in the film thickness direction and two-dimensionally and periodically arranged in each of a plurality of films differing in refractive index from each other, and the films are laminated so that the positions of the vacancies coincide with each other, the films being laminated in such order that a desired refractive index distribution is formed in the direction of lamination.

BRIEF DESCRIPTION OF THE DRAWINGS

FIGS. 9(a), 9(b), and 9(c) are diagrams showing the outline of a first slab waveguide fabrication method in a fifth embodiment of the present invention;

FIG. 14 is a diagram showing the outline of a slab waveguide fabrication method in a twelfth embodiment of the present invention;

FIGS. 17(a) to 17(f) are diagrams schematically showing refractive index distributions in the film thickness direction in the slab waveguides end surface working in the first to fourth embodiments of the present invention;

FIGS. 18(a), 18(b), and 18(c) are diagrams schematically showing slab waveguides in a fifteenth embodiment of the present invention;

FIGS. 21(a) to 21(d) are diagrams showing examples of conventional slab waveguides constituted by photonic crystals.

DESCRIPTION OF SYMBOLS

Figure 1:
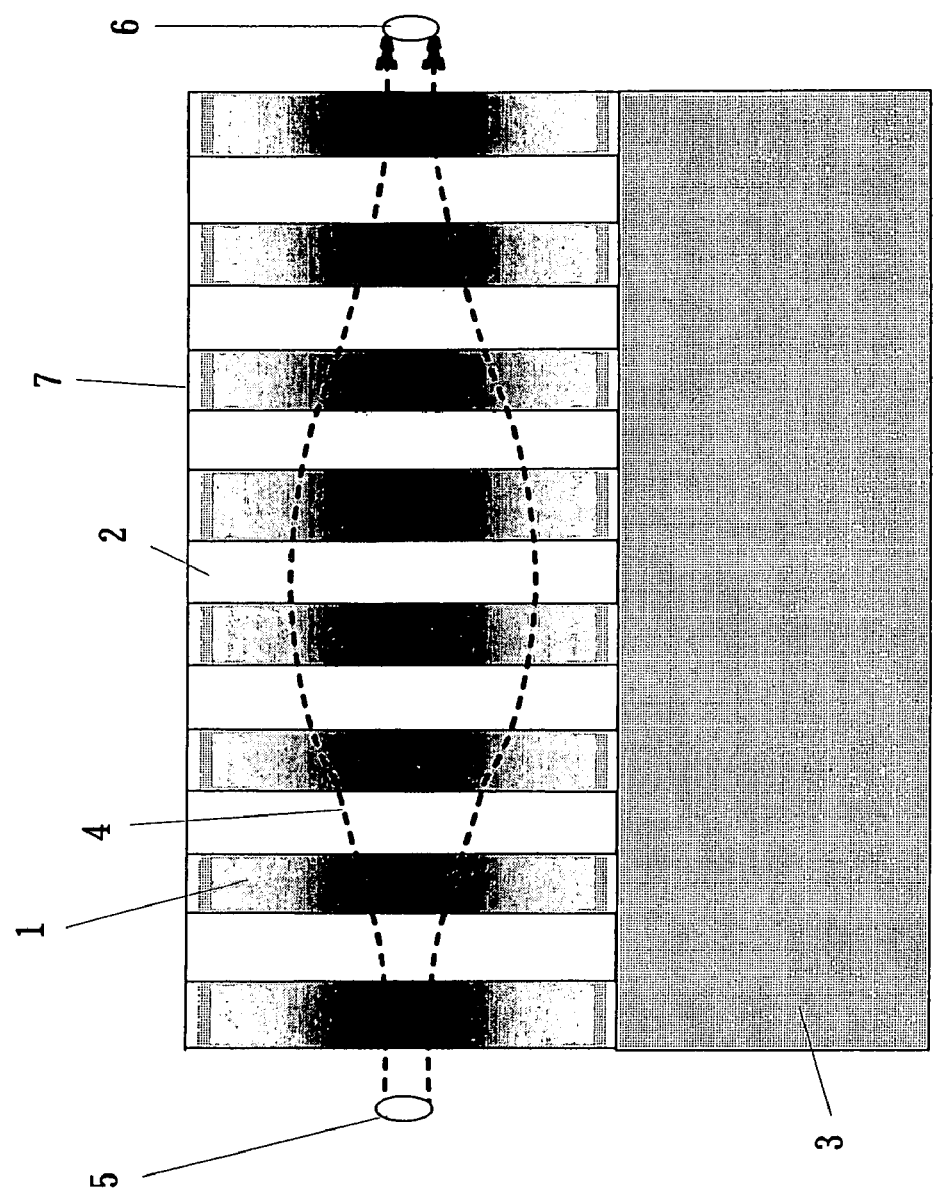
FIG. 1 is a schematic cross-sectional view of the construction of a slab waveguide in a first embodiment of the present invention.

1 Refractive index distributed slab
2 Vacancy
3 Substrate
4 Beam trail
5 Output-side beam waist
6 Input-side beam waist
7 Refractive index distributed slab-type photonic crystal
31 Beam trail
32 Input-side beam waist of refractive index distributed slab portion corresponding to one period
33 Output-side beam waist of refractive index distributed slab portion corresponding to one period
34 Input-side beam waist of slab-type photonic crystal
35 Output-side beam waist of slab-type photonic crystal
41 Slab refractive index portion
42 Vacancy
43 Substrate
44 Beam trail
45 Incidence end surface of slab-type photonic crystal
46 Emergence end surface of slab-type photonic crystal
47 Slab-type photonic crystal
48 Beam waist
61 Slab refractive index portion
62 Vacancy
63 Input-side beam waist of slab portion corresponding to one period
64 Output-side beam waist of slab portion corresponding to one period
65 Input-side beam waist of slab-type photonic crystal
66 Output-side beam waist of slab-type photonic crystal
67 Slab-type photonic crystal
68 Beam trail
70 Slab-type photonic crystal
71 Substrate
72 Slab refractive index portion
73 Vacancy
74 Substrate with vacancies
75 Refractive index distribution
80 Refractive index distributed slab-type photonic crystal
81 Film
82 Vacancy
83 Projection
84 Die
85 Heater
86 Photonic crystal film
87 Single-wavelength beam
88 Laminated photonic crystal film
89 Interference light
90 Substrate
91 Positioning pin
100 Refractive index distributed slab-type photonic crystal
101 Film
102 Refractive index distributed slab
103 Projection
104 Die
105 Heater
106 Vacancy
110 Substrate
111 Polymer before curing
112 Laminated film
113 Blade
114 Spin coater
115 Material to be deposited
116 Raw material source
117 Uniform-refractive-index slab
118 Ionized medium (electrolytic solution)
119 Ion
120 Refractive index distributed slab waveguide
121 Thick film
122 Base 123 Pressing member
124 Flat base surface
125 Pressing member flat surface
130 Tapered refractive index distributed slab waveguide
131 Laminated thick film
132 Base
133 Tapered pressing member
134 Flat base surface
135 Pressing member tapered surface
136 Slab waveguide end (film thickness large)
137 Slab waveguide end (film thickness small)
138 Slab waveguide width
139 Slab waveguide height
140 Refractive index distributed slab waveguide
141 Laminated thick film
142 First roller
142 Second roller
150 Refractive index distributed slab waveguide
151 Laminated thick film
152 First fixing jig
153 Second fixing jig
160 Quadratic curve refractive index distributed slab
161 Quadratic curve
162 Hybrid refractive index distributed slab
163 Quadratic curve portion
164 Constant portion
165 Quadratic surface
166 Non-quadratic surface
167 Curved surface
168 Non-curved surface
169 Diffraction surface
200 Slab-type photonic crystal
170 Refractive index distributed slab waveguide
171 Diffusing surface
172 Incidence surface
173 Emergence surface
174 Incident light
175 Emergent light
176 Diffused light
177 Inclined incidence surface (45°)
178 Inclined emergence surface (45°)
179 Prism coupler
180 Electrical substrate (multilayer)
181 Through hole
182 Incident light
183 Emergent light
184 Multilayer refractive index distributed slab waveguide
190 Refractive index distributed slab
191 Mask
192 Ion beam
193 Track
194 Photonic crystal slab
195 Strong alkali (NaOH)
196 Etched hole
201 Substrate
202 Vacancy
203 Slab
204 Incident light
205 Emergent light
206 Diffused light
207 Substrate vacancy

PREFERRED EMBODIMENTS OF THE INVENTION

Embodiments of the present invention will be described with reference to the accompanying drawings.

First Embodiment

Figure 2:
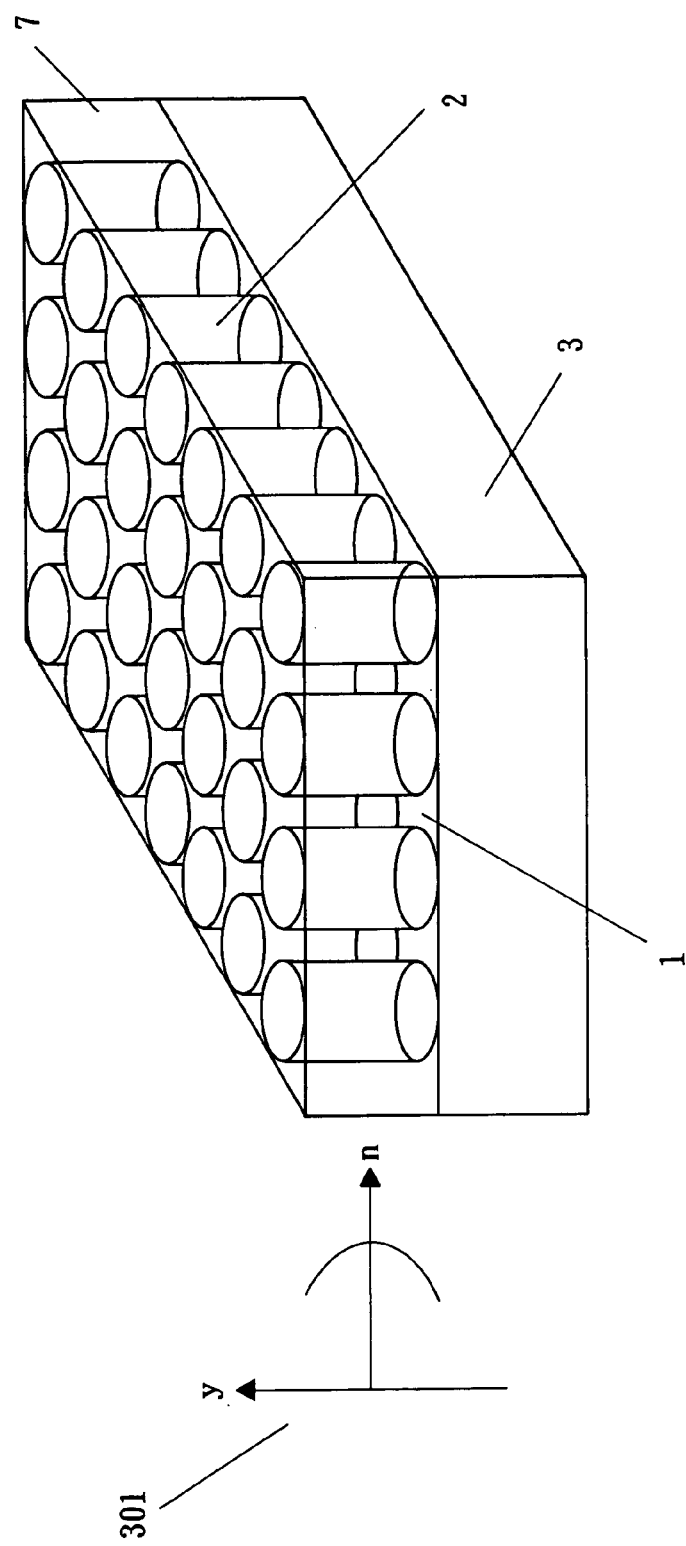
FIG. 2 is a perspective view of the slab waveguide in the first embodiment of the present invention.

FIG. 1 is a schematic cross-sectional view of the construction of a slab waveguide which represents a first embodiment of the present invention, and FIG. 2 is a perspective view of the slab waveguide of the first embodiment. In the slab waveguide of this embodiment, a slab-type photonic crystal is used which has variation in refractive index quadratically distributed in the film thickness direction as in a refractive index distribution 301 in a slab refractive index portion shown in FIG. 2.

That is, in the slab waveguide of this embodiment, the refractive index of a slab refractive index portion 1 other than vacancy 2 portions which are columnar members in the slab, and the number, the shape and the refractive index of vacancies 2 formed as columnar members are selected so that when a beam of light entering the waveguide expands to a maximum extent, the size of a beam of light in the slab thickness direction does not exceed the slab thickness.

Figure 3:
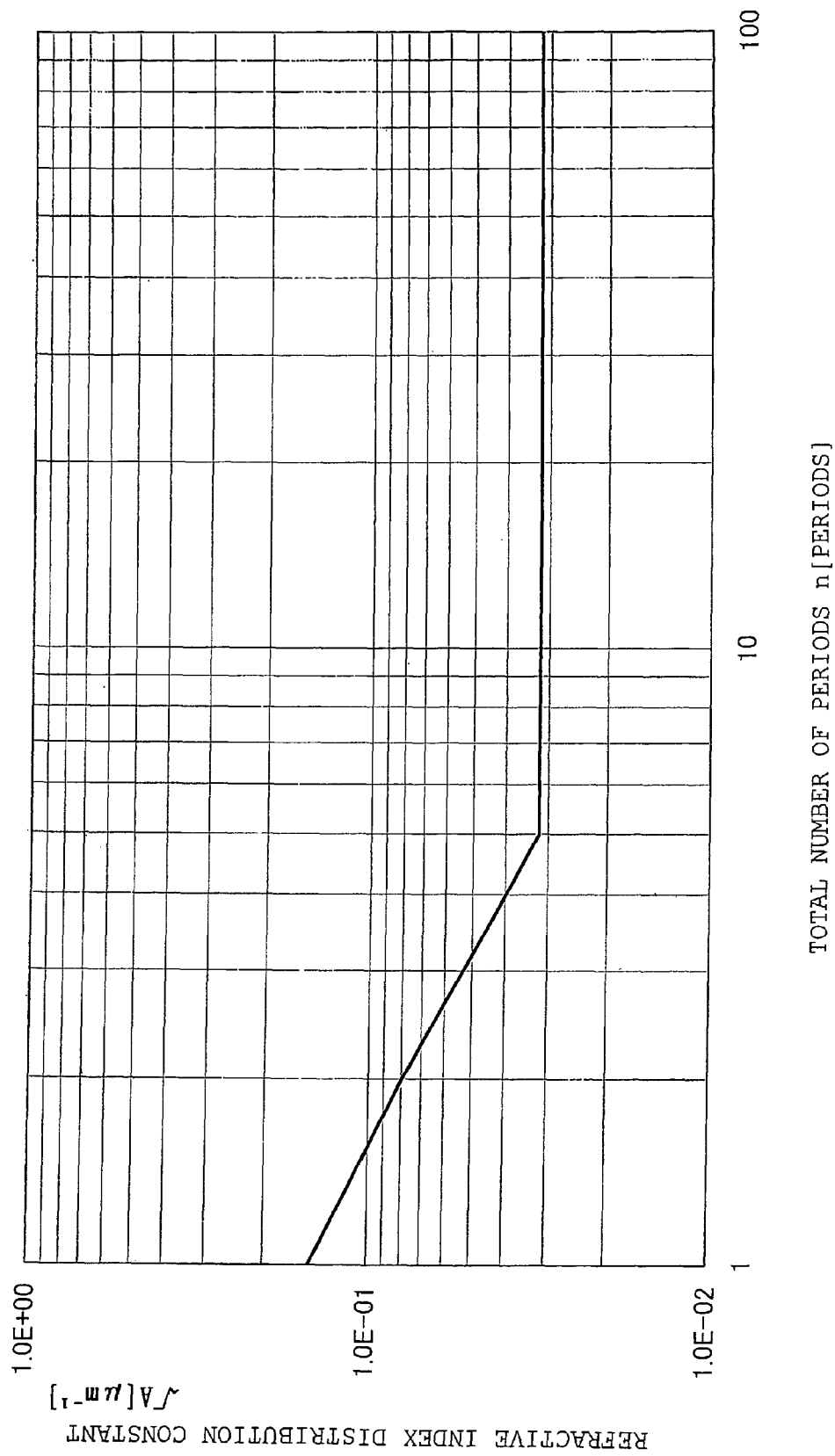
FIG. 3 is a diagram showing the relationship between a refractive index distribution constant and the total number of periods of the photonic crystal of the slab waveguide in the first embodiment of the present invention.

FIG. 3 shows the relationship between the total number of periods in the slab-type photonic crystal and a refractive index distribution constant ($A^{1/2}$) selected to set the total optical path length of the slab waveguide to such a value that the spot diameters on the incidence and emergence sides are equal to each other, the total optical path length being defined by such an optical pitch as to be an integer multiple of 0.5 in a case where the slab refractive index is about 1.5.

The slab waveguide of the first embodiment in which this slab-type photonic crystal is used is constituted by a substrate 3 and a slab-type photonic crystal 7 which forms a slab on the substrate 3, in which vacancies 2 extending in the film thickness direction of the slab are two-dimensionally and periodically arranged, and which has a two-dimensional crystal grating formed by the above-mentioned slab refractive index portion 1 and the vacancies 2, as shown in FIGS. 1 and 2. That is, the slab waveguide of this embodiment has a structure in which vacancies having a refractive index different from that of the slab are two-dimensionally and periodically arranged in the slab along slab surfaces. Also, the refractive index (n) of the slab as seen along the film thickness direction is defined by a maximal point (no) of the refractive index, a distance (r) from the maximal point and the refractive index distribution constant ($A^{1/2}$) not smaller than 1 mm$^{-1}$ over the film thickness of the slab as shown in Equation (1).

$$n=n_0(1-Ar^2/2) \quad \text{[Equation 1]}$$

If the refractive index distribution constant ($A^{1/2}$) is selected to set the total optical path length of the above-described slab waveguide to such a value as to be defined by an optical 0.5 pitch, the beam shapes on the incidence and emergence sides are equal to each other, as shown in FIG. 1. That is, in a case where a beam propagating through the above-described slab waveguide is an expanding beam having a beam waist at the front of the incidence end (FIG. 1), a trail 4 of the beam expands gradually in the slab waveguide in such a manner that the angle of expansion becomes smaller and becomes zero substantially at the center of the total optical path length, and, after this expansion, the beam becomes convergent and has a beam waist at the rear of the emergence end of the slab waveguide.

It can be understood from FIG. 3 that, in the case of a slab having a refractive index of about 1.5 and formed by an ordinary photonic crystal having five periods or more as a total number of periods, the total optical path length of the slab waveguide is defined by such an optical pitch as to be an integer multiple of 0.5 when the refractive index distribution constant ($A^{1/2}$) is about 0.03 µm$^{-1}$ (=30 mm$^{-1}$)

The above-described refractive index distribution is an example of a distribution along a quadratic curve shown in FIG. 17(a). A different refractive index distribution is also possible. For example, one such as shown in FIG. 17(b) can be mentioned which is expressed by a curve constituted by a refractive-index-constant portion indicating a constant maximum refractive index in a finite region about a center, and refractive-index-reduction portion indicating the reduction in refractive index along a quadratic curve with respect to the distance from each end of the refractive-index-constant portion.

Further, a distribution along a quadratic curve may be an approximately quadratic curve. This can be said in later embodiments.

Further, "a predetermined portion other than end portions" of the present invention is desired to locate at the center portion in the slab refractive index portion. However, it is not restricted to this.

Second Embodiment

A second embodiment of the present invention will be described.

Figure 4:
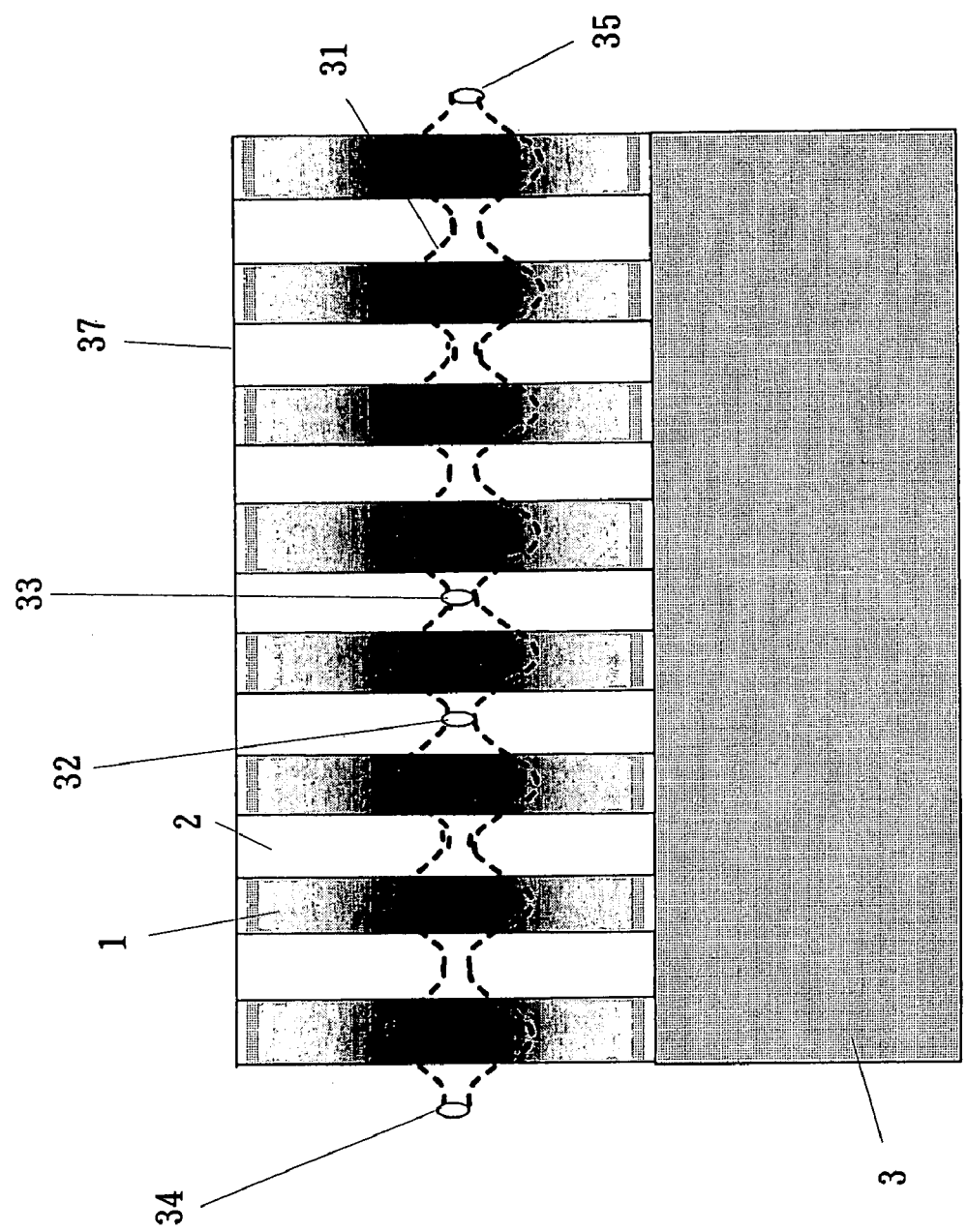
FIG. 4 is a schematic cross-sectional view of the construction of a slab waveguide in a second embodiment of the present invention.

FIG. 4 is a schematic cross-sectional view of the construction of a slab waveguide which represents the second embodiment of the present invention. In the slab waveguide of this embodiment, a slab-type photonic crystal having variation in refractive index quadratically distributed in the film thickness direction is used.

The slab waveguide of the second embodiment in which a slab-type photonic crystal is used is constituted by a substrate 3 and a slab-type photonic crystal 37 which forms a slab on the substrate 3, in which vacancies 2 extending in the film thickness direction of the slab are two-dimensionally and periodically arranged, and which has a two-dimensional crystal grating formed by the above-described slab refractive index portion 1 and the vacancies 2, as shown in FIG. 4. Also, the refractive index (n) of the slab as seen along the film thickness direction is defined by a maximal point ($n_0$) of the refractive index, a distance (r) from the maximal point and a refractive index distribution constant ($A^{1/2}$) not smaller than 1 mm$^{-1}$ with the film thickness as shown in Equation (1). The refractive index distribution constant ($A^{1/2}$) is a value selected to equate the sum of the incidence-side focal distance and the emergence-side focal distance corresponding to one period of the slab refractive index portion 1 constituting the slab waveguide, and the period of the two-dimensional crystal grating formed by the slab refractive index portion 1 and the vacancies 2 periodically arranged.

Also in the case where the refractive index distribution constant ($A^{1/2}$) is selected to equate the incidence-side focal distance and the emergence-side focal distance corresponding to one period of the slab refractive index portion 1 constituting the slab waveguide and to equate the value twice the focal distance and the period of the two-dimensional crystal grating formed by the slab refractive index portion 1 and the vacancies 2 periodically arranged, the beam shapes on the incidence and emergence sides are equal to each other, as shown in FIG. 4. That is, a trail 31 of a beam propagating through the above-described slab waveguide has beam waists (32 and 33) on the incidence and emergence sides of each portion corresponding to one period in the slab refractive index portion 1. Therefore, the trail 31 also has symmetric beam waists (34 and 35) on the incidence and emergence sides of the slab-type photonic crystal 37.

The condition for providing beam waists (32 and 33) on the incidence and emergence sides of each portion corresponding to one period in the slab refractive index portion 1 corresponds to the case where the total number of periods shown in FIG. 3 is one and the refractive index distribution constant ($A^{1/2}$) is about 0.15 µm$^{-1}$ (=150 mm$^{-1}$).

Thus, the slab-type photonic crystal 37 having variation in refractive index quadratically distributed in the film thickness direction according to the refractive index distribution constant not smaller than 1 mm$^{-1}$ is used to ensure that the beam trail is within the film thickness of the slab-type photonic crystal 37 regardless of the film thickness of the slab-type photonic crystal 37. Even though the slab waveguide has a substrate, the beam trail does not reach the boundary on the substrate, so that light can propagate through the waveguide without leaking.

Further, the variation in refractive index quadratically distributed in the film thickness direction is such that the speed of propagation of light is constant with respect to any incident angles, so that single-mode conditions can be satisfied. Therefore, the film thickness of the slab-type photonic crystal 37 can be set so as to match the mode field diameter of an optical fiber and the slab-type photonic crystal 37 can be easily coupled to the optical fiber.

While the embodiment has been described with respect to a case where the slab refractive index is about 1.5, the refractive index can be freely selected if the above-described suitable refractive index distribution constant ($A^{1/2}$) is selected and any material may be used if it is optically transparent. Ordinarily, the photonic crystal is constructed for refractive index modulation of about 1.0 to 4.0. Distribution of columnar members made of a low-refractive-index material (a polymer or glass) in a slab made of a high-refractive-index material (Si, GaAS, $Ti_2O_5$ or the like) can also be performed as well as the above-described distribution of vacancies in a solid slab (made of a high-refractive-index material such as Si, GaAS or $Ti_2O_5$ or a low-refractive-index material such as glass). The polymer material for the columnar members is, for example, an acrylic polymer (PMMA, an UV acrylate polymer, etc.), an epoxy polymer, a polyimide polymer, or a silicone polymer. The vacancies in this embodiment are an example of the columnar members in accordance with the present invention.

Since it is important to select the refractive index of the photonic crystal, any material other than those mentioned above may be selected from solids (dielectrics in general, e.g., oxides), liquids (water, ethyleneglycol, etc.) and gases (air, inert gases, etc.) if it satisfies the above-described refractive index condition.

Third Embodiment

A third embodiment of the present invention will be described.

Figure 5:
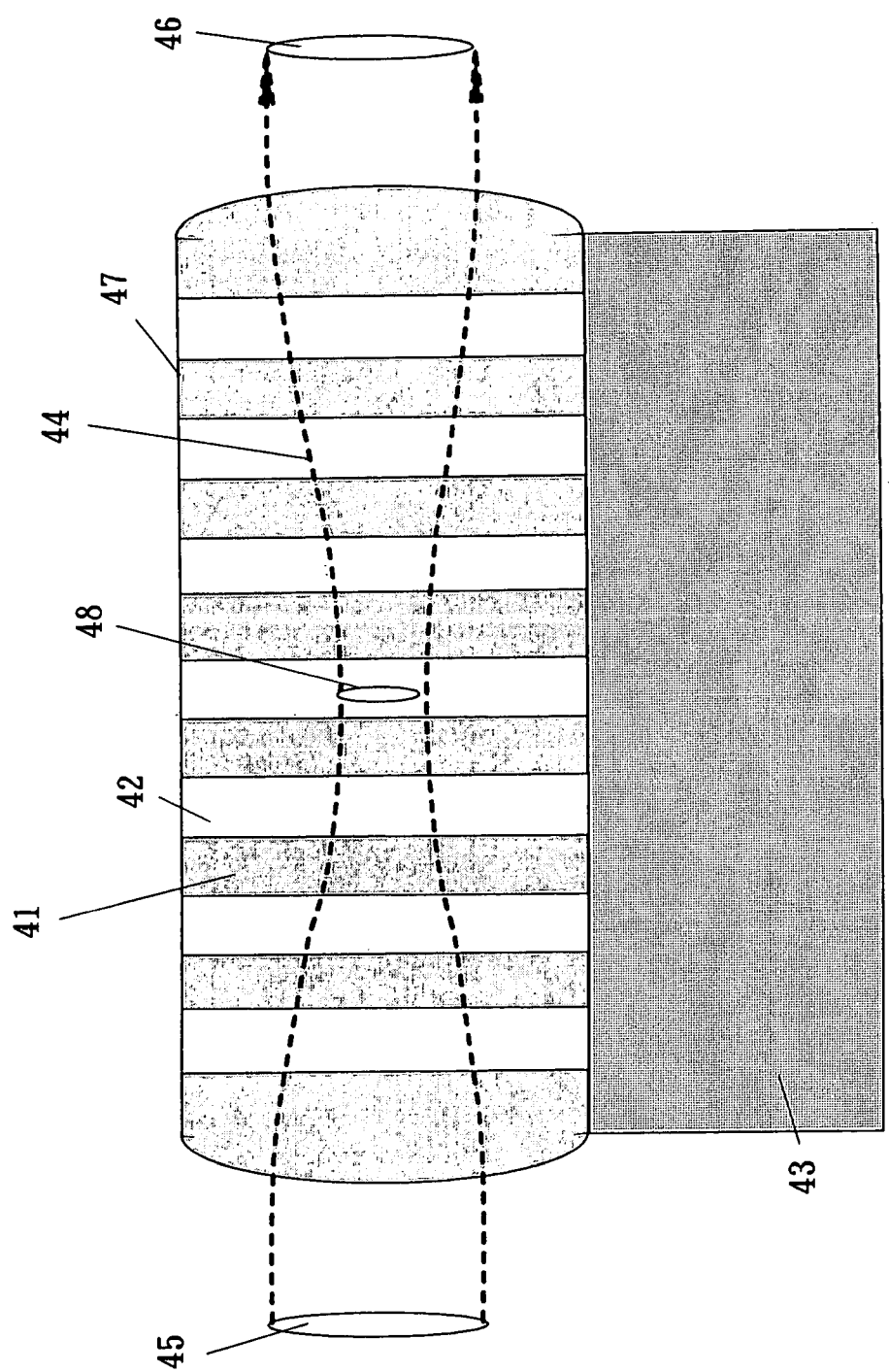
FIG. 5 is a schematic cross-sectional view of the construction of a slab waveguide in a third embodiment of the present invention.
Figure 6:
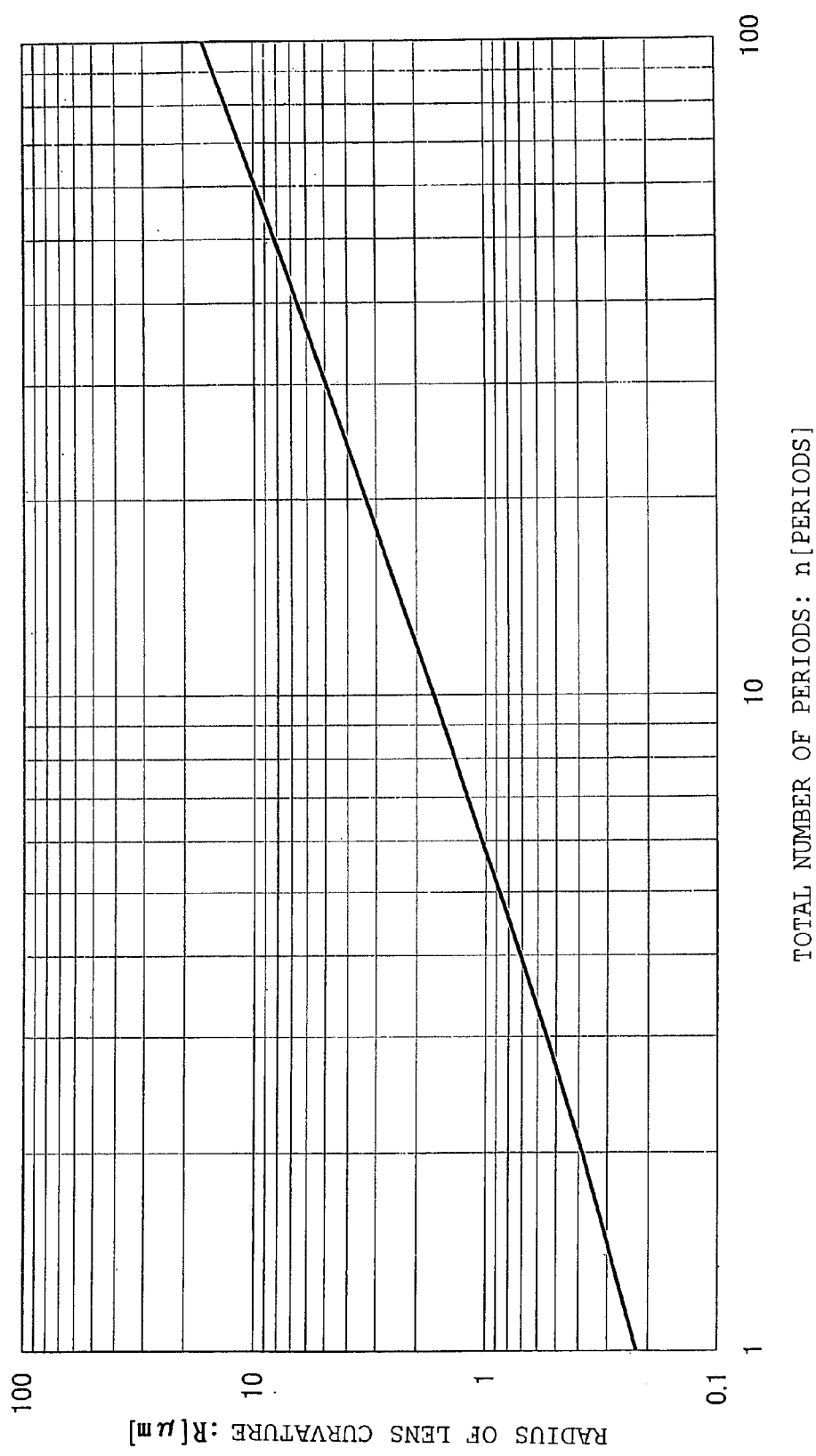
FIG. 6 is a diagram showing the relationship between a radius of curvature and the total number of periods of the photonic crystal in the slab waveguide in the third embodiment of the present invention.

FIG. 5 is a schematic cross-sectional view of the construction of a slab waveguide which represents the third embodiment of the present invention. In the slab waveguide of this embodiment, a slab-type photonic crystal having curved surfaces as incidence-end and emergence-end surfaces in the film thickness direction is used. FIG. 6 shows the relationship between the total number of periods in the slab-type photonic crystal and a radius of curvature at which the slab waveguide having equal spot diameters on the incidence and emergence sides in a case where the slab refractive index is about 1.5 functions optically as a lens.

The slab waveguide of this embodiment in which the slab-type photonic crystal is used is constituted by a substrate 43 and a slab-type photonic crystal 47 which forms a slab on the substrate 43, in which vacancies 42 extending in the film thickness direction of the slab are two-dimensionally and periodically arranged, and which has a two-dimensional crystal grating formed by a slab refractive index portion 41 and the vacancies 42, as shown in FIG. 5. Each of an incidence-end surface 45 and an emergence-end surface 46 of the above-described slab-type photonic crystal 47 is a curved surface having a radius of curvature of 0.1 μm or greater.

If the radius of curvature of the incidence-end surface 45 and the emergence-end surface 46 is selected to enable the slab-type photonic crystal 47 to function optically as a lens having the same beam waists (focal points) on the incidence and emergence sides, the beam shapes on the incidence and emergence sides are equal to each other, as shown in FIG. 5. That is, a trail 44 of a beam propagating through the above-described slab waveguide is formed in such a manner that an incident light beam is converted into a convergent beam at the incidence-end surface, and this beam forms a beam waist (minimum beam spot) 48 substantially at the center of the total optical path length by diffraction in the slab-type photonic crystal 47, then becomes an expanding beam, and is again converted into a convergent beam at the slab waveguide emergence-end surface to form a beam shape symmetric with the incident beam.

It can be understood from FIG. 6 that, in the case of a slab having a refractive index of about 1.5, if the incidence-end surface 45 and the emergence-end surface 46 have a radius of curvature of 1/10 μm, i.e., 1/10 of the total number of periods of the slab-type photonic crystal 47 in micrometers (a length defined by 1/10 of the total number of periods expressed in micrometers), the slab waveguide functions optically as a lens.

While each of the curved surfaces formed as the end surface of the slab waveguide has been described as a quadratic surface such as shown in FIG. 17(c), it may alternatively be, for example, a non-quadratic surface such as shown in FIG. 17(d), a surface constituted by a non-curved surface (flat surface) portion about a center and a peripheral curved surface portion as shown in FIG. 17(e), or a Fresnel lens type having a diffraction surface such as shown in FIG. 17(f).

Fourth Embodiment

A fourth embodiment of the present invention will be described.

Figure 7:
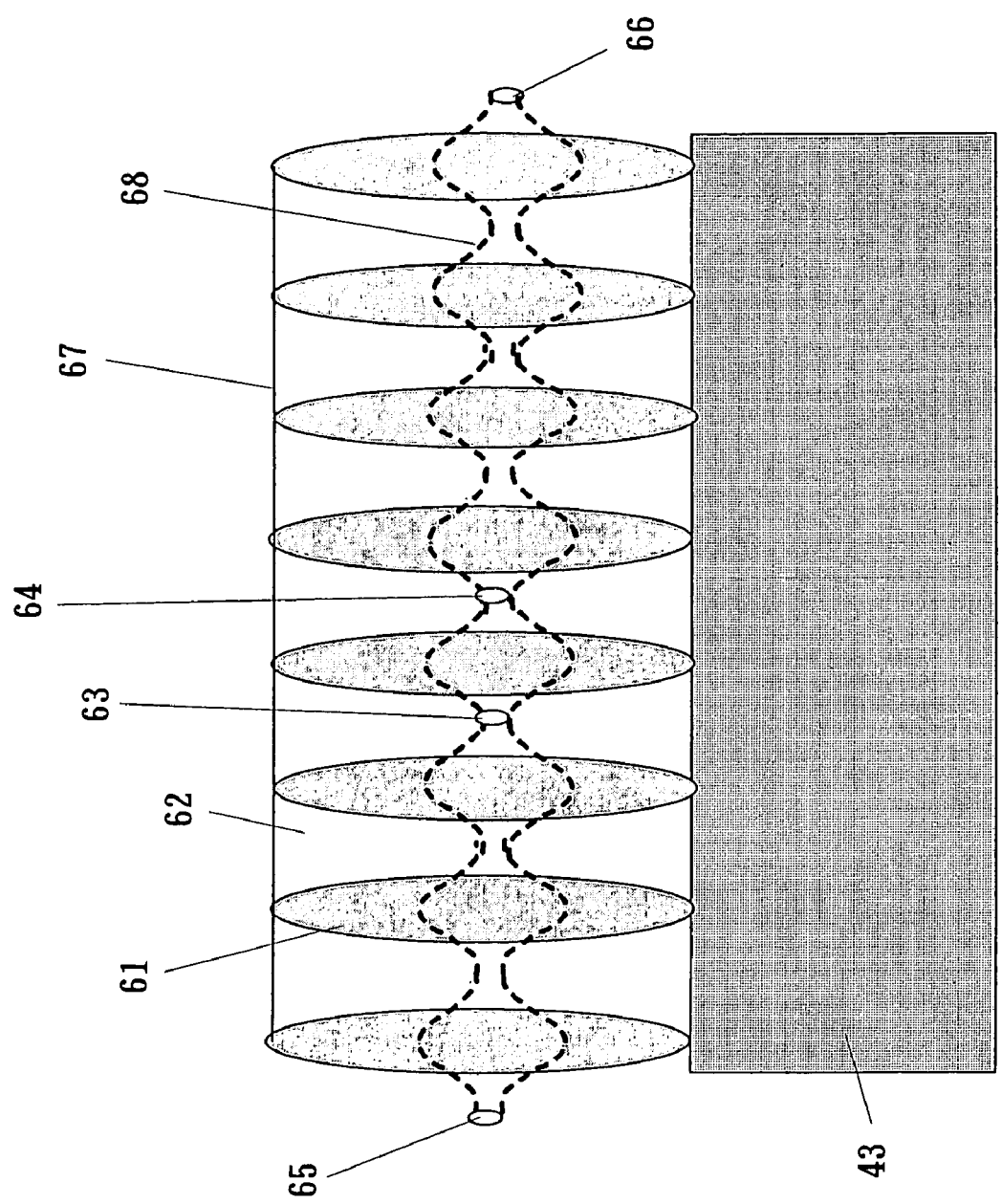
FIG. 7 is a schematic cross-sectional view of the construction of a slab waveguide in a fourth embodiment of the present invention.

FIG. 7 is a schematic cross-sectional view of the construction of a slab waveguide which represents the fourth embodiment of the present invention.

That is, in the slab waveguide of this embodiment, a slab-type photonic crystal having variation in refractive index quadratically distributed in the film thickness direction is used.

The slab waveguide of the second embodiment in which a slab-type photonic crystal is used is constituted by a substrate 43 and a slab-type photonic crystal 67 which forms a slab on the substrate 43, in which vacancies 62 extending in the film thickness direction of the slab are two-dimensionally and periodically arranged, and which has a two-dimensional crystal grating formed by a slab refractive index portion 61 and the vacancies 62, as shown in FIG. 7. Each of the boundaries between the slab refractive index portion 61 and the vacancies 62 has a curved surface in the film thickness direction of the slab. The radius of curvature of the curved surface is such that the sum of the incidence-side focal distance and the emergence-side focal distance corresponding to one period of the slab refractive index portion 61 is equal to the period of the two-dimensional crystal grating formed by the slab refractive index portion 61 and the vacancies 62 periodically arranged.

That is, each vacancy 62 has such a shape that its radius is smaller at its center in the slab thickness direction and is increased along a direction from the center to one of the slab surfaces. The surfaces of the boundaries between the vacancies 62 and the slab refractive index portion 61 have a curved surface in accordance with a quadratic function in the slab thickness direction.

Also in the case where the radius of curvature is selected at which the incidence-side focal distance and the emergence-side focal distance corresponding to one period of the slab refractive index portion 61 and at which the value twice the focal distance and the period of the two-dimensional crystal grating formed by the slab refractive index portion 61 and the vacancies 62 periodically arranged are equal to each other, the beam shapes on the incidence and emergence sides are equal to each other, as shown in FIG. 7. That is, a trail 68 of a beam propagating through the above-described slab waveguide has beam waists (63 and 64) on the incidence and emergence sides of each portion corresponding to one period in the slab refractive index portion 61. Therefore, the trail 68 also has symmetric beam waists (65 and 66) on the incidence and emergence sides of the slab-type photonic crystal 67.

The condition for providing beam waists (63 and 64) on the incidence and emergence sides of each portion corresponding to one period in the slab refractive index portion 61 corresponds to the case where the total number of periods shown in FIG. 6 is one and the radius of curvature is about 0.22 μm$^{-1}$ (=220 mm$^{-1}$).

Thus, the slab-type photonic crystal 47 in which the incidence-end surface and the emergence-end surface have a radius of curvature of about 0.1 μm$^{-1}$ or greater, or the slab-type photonic crystal 67 formed by periodically arranging portions in the slab refractive index portion 61 and the vacancies 62 forming incidence-end and emergence-end surfaces having a radius of curvature of about 0.1 μm$^{-1}$ or greater is used to ensure that the beam trail is within the film thickness of the slab-type photonic crystal regardless of the film thickness of the slab-type photonic crystal 47 or 46. Even though the slab waveguide has a substrate, the beam trail does not reach the boundary on the substrate, so that light can propagate through the waveguide without leaking. Further, the radius of curvature at each end surface functions like a lens so that the speed of propagation of light is constant with respect to any incident angles, so that single-mode conditions can be satisfied. Therefore, the film thickness of the slab-type photonic crystal can be set so as to match the mode field diameter of an optical fiber and the slab-type photonic crystal can be easily coupled to the optical fiber.

While the embodiments have been described with respect to a case where the slab refractive index is about 1.5, the refractive index can be freely selected if the above-described suitable radius of curvature is selected and any material may be used if it is optically transparent. Ordinarily, the photonic crystal is constructed for refractive index modulation of about 1.0 to 4.0. Distribution of columnar members made of a low-refractive-index material (a polymer or glass) in a slab made of a high-refractive-index material (Si, GaAS, $Ti_2O_5$ or the like) can also be performed as well as the above-described distribution of vacancies in a solid slab (made of a high-refractive-index material such as Si, GaAS or $Ti_2O_5$ or a low-refractive-index material such as glass). The polymer material for the columnar members is, for example, an acrylic polymer (PMMA, an UV acrylate polymer, etc.), an epoxy polymer, a polyimide polymer, or a silicone polymer.

Since it is important to select the refractive index of the photonic crystal, any material other than those mentioned above may be selected from solids (dielectrics in general, e.g., oxides), liquids (water, ethylene glycol, etc.) and gases (air, inert gases, etc.) if it satisfies the above-described refractive index condition.

The refractive index distribution profile of the refractive index distributed type of slab described in the description of the first and second embodiments is not limited to that indicated by a secondary curve as shown in FIG. 17(a). A hybrid type such as shown in FIG. 17(b), including a state where the refractive index is generally constant about a center, can also be used.

The profile of the curved surfaces at the incidence and emergence ends of the slab described in the description of the third and fourth embodiments is not limited to the quadratic surface type shown in FIG. 17(c). A non-quadratic surface type such as shown in FIG. 17(d), a hybrid type such as shown in FIG. 17(e), in which a curved surface and a non-curved surface are mixed, and a Fresnel type such as shown in FIG. 17(f) using diffraction can also be used.

Figure 8:
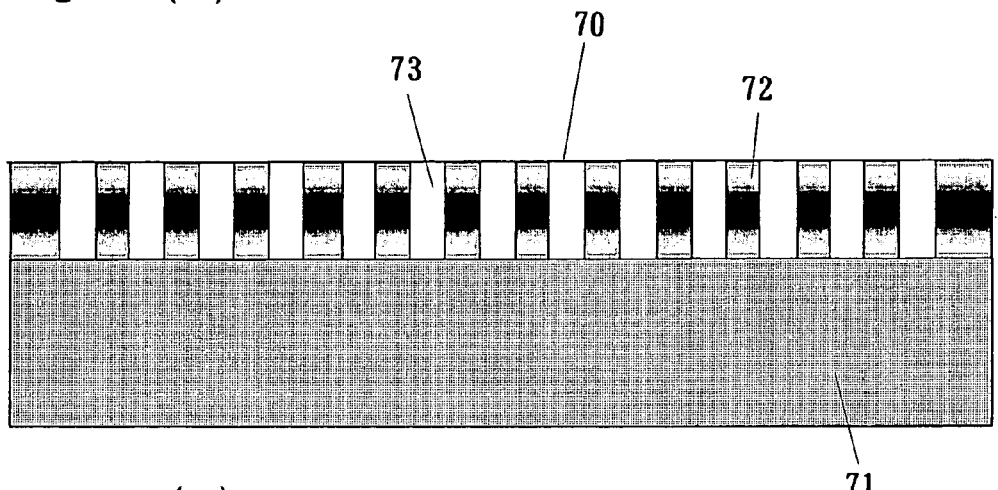
FIGS. 8(a), 8(b), and 8(c) are diagrams schematically showing the substrates of the slab waveguides in the first to fourth embodiments of the present invention.
Figure 8:
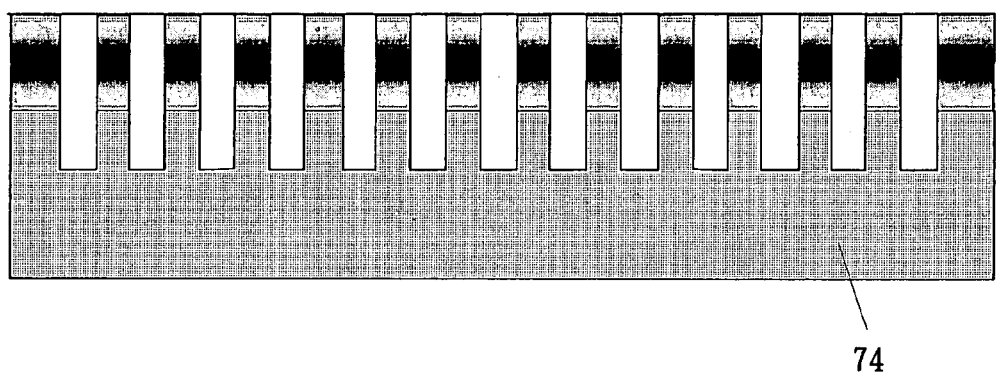
Figure 8:
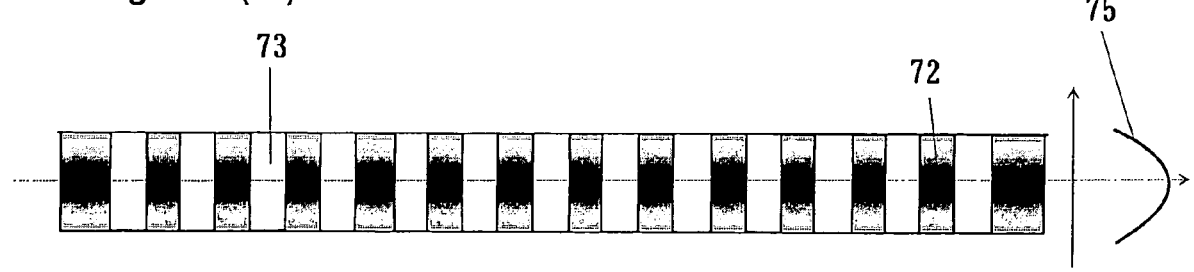

The described embodiments correspond to an example of formation of a slab-type photonic crystal 70 on a substrate 71 as shown in FIG. 8(a). In the slab-type photonic crystals in a refractive index distributed lens form in the first and second embodiments or in the slab-type photonic crystals in a curved-surface lens form, however, the propagating beam does not reach the boundary on the slab-type photonic crystal in the film thickness direction and, therefore, the state of propagation of light is independent of the condition of the substrate. Therefore, a structure in which vacancies are also formed in a substrate portion as shown in FIG. 8(b) or a structure using no substrate as shown in FIG. 8(c) can also be used without a problem concerning the condition of the substrate.

Embodiments of the present invention relating to methods of fabricating the above-described slab-type photonic crystal having a refractive index distribution (a graded index) in the film thickness direction will be described.

Methods of fabricating a slab-type photonic crystal having a refractive index distribution in the film thickness direction are roughly grouped into two methods shown below.

(1) Vacancies are two-dimensionally and periodically arranged in each of a plurality of films differing in refractive index from each other so as to extend in the film thickness direction, and the films are laminated in such order to obtain the desired refractive index distribution in the direction of lamination, with the vacancy positions in the films aligned with each other.

(2) A plurality of films differing in refractive index from each other are laminated to make a slab waveguide having a refractive index distribution, and vacancies to be two-dimensionally and periodically arranged so as to extend in the film thickness direction are thereafter made.

An example of the fabrication method (1) and an example of the fabrication method (2) will be described as a fifth embodiment and a sixth embodiment, respectively, of the present invention.

Fifth Embodiment

The fifth embodiment of the present invention will be described.

Figure 10C:
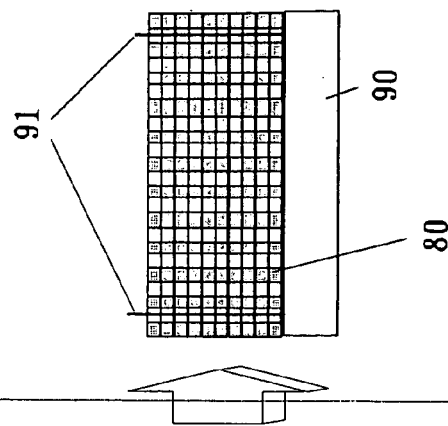
FIGS. 10(a), 10(b), and 10(c) are diagrams showing the outline of a second slab waveguide fabrication method in the fifth embodiment of the present invention.
Figure 10B:
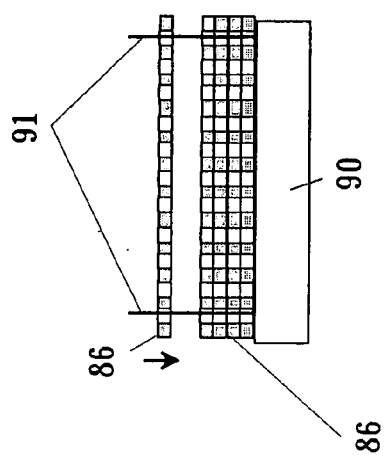
Figure 10A:
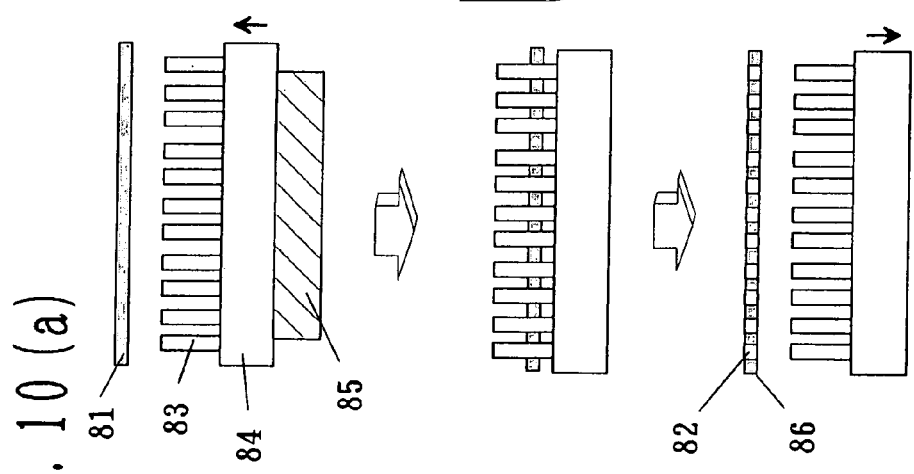

FIGS. 9 and 10 show the outline of a method of fabricating a slab waveguide according to the fifth embodiment.

FIGS. 9 and 10 are diagrams showing the method of fabricating a slab waveguide constituted by a refractive index distributed slab type of photonic crystal in which vacancies are two-dimensionally and periodically arranged.

In the method of fabricating a slab waveguide by using a refractive index distributed slab type of photonic crystal in this embodiment, an ideal refractive index distribution in the film thickness direction in a desired slab waveguide 80 is divided into m portions as partial slabs in the film thickness direction, as shown in FIG. 9(c). The refractive index of each of the divided m partial slabs is determined as a value between the maximum and minimum of the distributed values of the refractive index of the partial slabs, e.g., a mean value (the refractive index of the kth partial slab: nk) (k=1 to m), and m films 81 (first to mth films) having refractive indices corresponding to the m partial slabs are prepared, as shown in FIG. 9(a). A die 84 having projections 83 in correspondence with the positions of vacancies 82 to be two-dimensionally and periodically arranged in the slab-type photonic crystal 80 is pressed on each film 81 to form the desired vacancies 85, and the die 84 is thereafter moved away from the film 81. If the die 84 is pressed in a heated state as shown in FIG. 9(a), the facility with which working for forming the vacancies is performed is improved. Not only the die 84 but also the film 81 may be heated together.

A method of laminating photonic crystal films having vacancies formed therein while aligning the vacancy positions will next be described.

A first example of this method is as described below. As shown in FIG. 9(b), when each of photonic crystal films 86 having vacancies formed therein is laminated, the photonic crystal film 86 is irradiated with single-wavelength light 87 perpendicularly applied to the film. The photonic crystal film 86 to be laminated is horizontally moved while interference light 89 from laminated film 88 is observed. When the distribution of interference light becomes symmetric, the film is positioned and laminated.

A second example of this method is as described below. As shown in FIG. 10(b), a plurality of photonic crystal films 86 having vacancies formed therein are successively laminated, while a plurality of positioning pins 91 thinner than the vacancies formed in the films are stood in correspondence with the vacancy positions in the film on a substrate 90.

Sixth Embodiment

The sixth embodiment of the present invention will be described.

Figure 11:
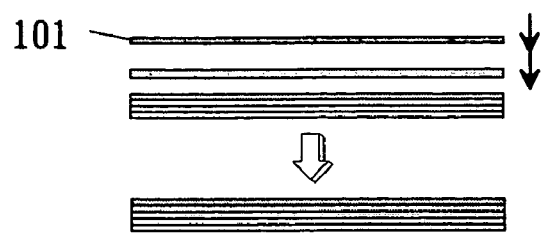
FIGS. 11(a) and 11(b) are diagrams showing the outline of a first slab waveguide fabrication method in a sixth embodiment of the present invention.
Figure 11:
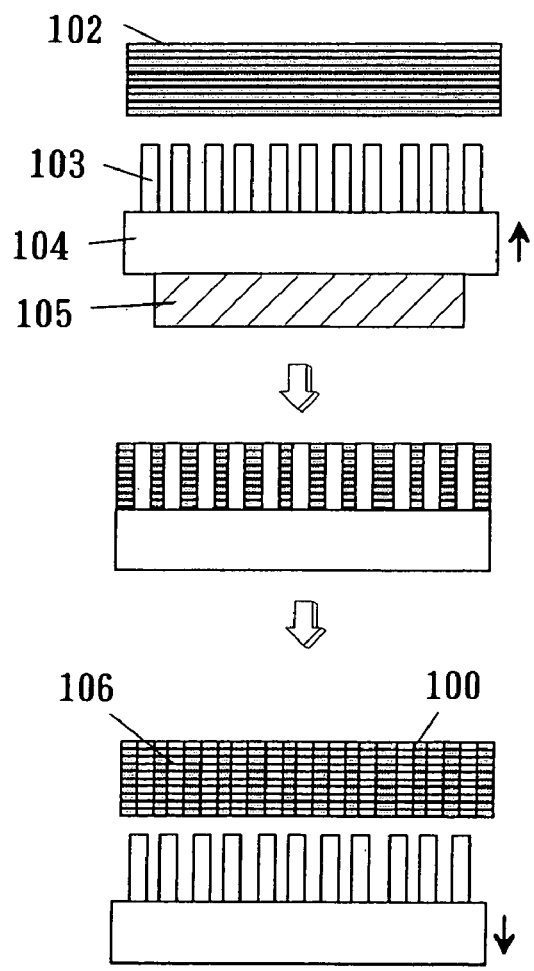
Figure 20:
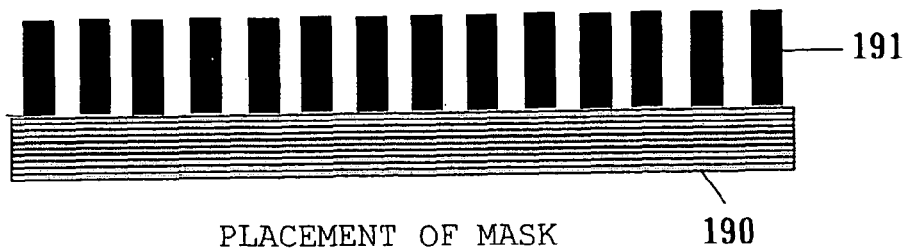
FIGS. 20(a), 20(b), and 20(c) are diagrams showing the outline of a second slab waveguide fabrication method (track etching) in the sixth embodiment of the present invention.
Figure 20:
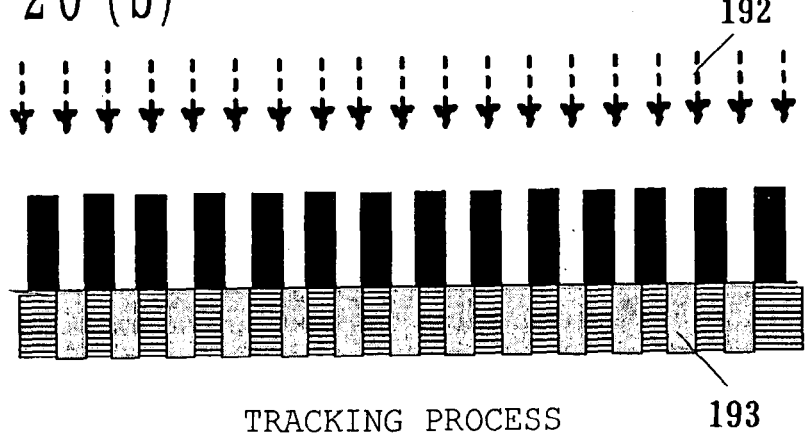
Figure 20:
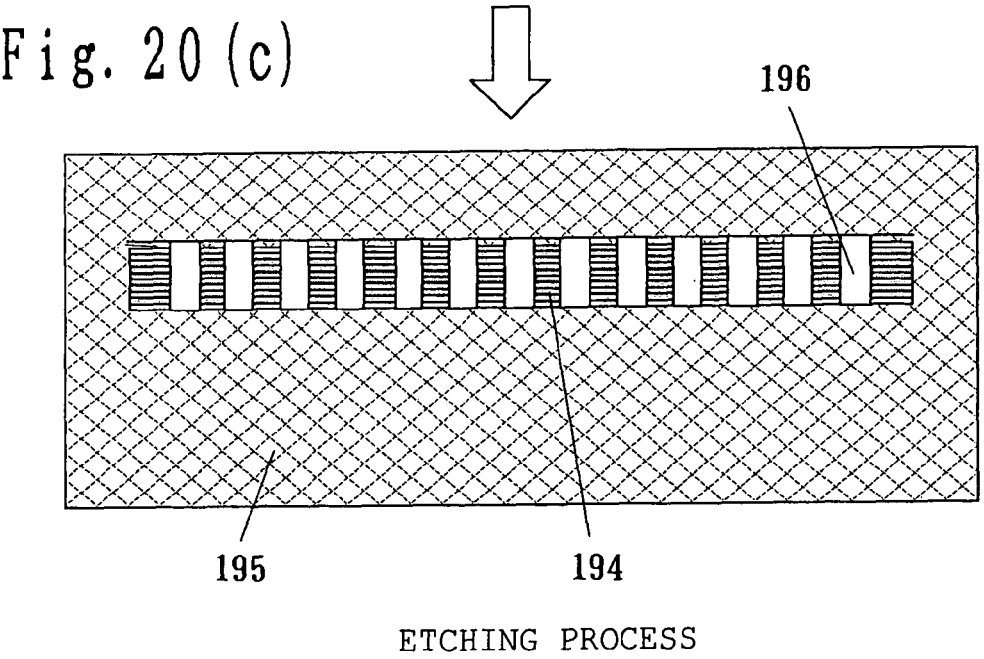

FIGS. 11 and 20 show the outlines of methods of fabricating a slab waveguide according to the sixth embodiment.

FIGS. 11(a) and 11(b) are diagrams showing the outline of a first method of fabricating a slab waveguide constituted by a refractive index distributed slab type of photonic crystal in which vacancies are two-dimensionally and periodically arranged. FIGS. 20(a), 20(b), and 20(c) are diagrams showing the outline of a second method of fabricating a slab waveguide constituted by a refractive index distributed slab type of photonic crystal in which vacancies are two-dimensionally and periodically arranged.

The first slab waveguide fabrication method shown in FIGS. 11(a) and 11(b) will first be described.

In the first fabrication method, an ideal refractive index distribution in the film thickness direction in a desired slab waveguide 100 is divided into m portions as partial slabs in the film thickness direction, as shown in FIG. 11(a). The refractive index of each of the divided m partial slabs is determined as a value between the maximum and minimum of the distributed values of the refractive index of the partial slabs, e.g., a mean value (the refractive index of the kth partial slab: nk) (k=1 to m), and m films 101 (first to mth films) having refractive indices corresponding to the m partial slabs are prepared. The film thickness of each film 101 and the number of films 101 are adjusted so as to have the film thickness corresponding to that of the slab when the films 101 are laminated.

As shown in FIG. 11(b), after a refractive index distributed slab waveguide 102 has been formed by laminating the above-described films differing in film thickness and having a pseudo quadratic diffraction distribution in the film thickness direction, i.e., a refractive index distribution substantially in accordance with a quadratic function, a die 104 having projections 103 in correspondence with the positions of vacancies 106 to be two-dimensionally and periodically arranged as desired in the refractive index distributed slab waveguide 102 is pressed on the slab waveguide to form the desired vacancies 106. The die 104 is thereafter moved away from the slab waveguide. If the die 104 is pressed in a heated state, the facility with which working for forming the vacancies is performed is improved. Not only the die but also the films may be heated together.

The first slab waveguide fabrication method is as described above. The second slab waveguide fabrication method will next be described.

The method of fabricating a slab waveguide 190 formed by laminating films and having a refractive index distribution in the second fabrication method is the same as that shown in FIG. 11(a). As a method of forming vacancies in the slab waveguide 190 shown in FIG. 20, a method described below is used. That is, anion implantation process (tracking process) is performed in which a mask 191 having vacancies two-dimensionally and periodically arranged at desired positions is superposed the slab waveguide 190 as shown in FIG. 20(a) and, in this state, the slab waveguide 190 is irradiated with ion beams 192 as shown in FIG. 20(b) to form tracks 193 in the refractive index distributed slab waveguide 190 in correspondence with the positions of the vacancies in the mask. Thereafter, as shown in FIG. 20(c), a process (etching process) is performed in which the refractive index distributed slab waveguide 190 after irradiation with ions is immersed in an etching solution of strong alkali (NaOH) 195 to transfer the vacancy pattern of the mask 191 to the refractive index distributed slab waveguide 190. The size of the vacancies in the slab waveguide is controlled through etching conditions (e.g., concentration and time) in the etching process.

As a method of forming vacancies in the slab waveguide by using the mask 191, a dry etching method or the like can be alternatively used.

Embodiments of the present invention relating to methods of fabricating the above-described slab waveguide having a refractive index distribution in the film thickness direction will be described.

Methods of fabricating a slab waveguide having a refractive index distribution in the film thickness direction are roughly grouped into two methods shown below.

(1) A refractive index distribution is formed in actual size without using any enlargement/reduction process.

(2) A slab having a refractive index distribution in a similitude relationship with that in a slab waveguide is made and is reduced or increased in size to fabricate the slab waveguide having the desired refractive index distribution.

Examples of the fabrication method (1) will be described as seventh to tenth embodiments of the present invention, and examples of the fabrication method (2) will be described as eleventh to fourteenth embodiments of the present invention.

Seventh Embodiment

The seventh embodiment of the present invention will be described.

Figure 12:
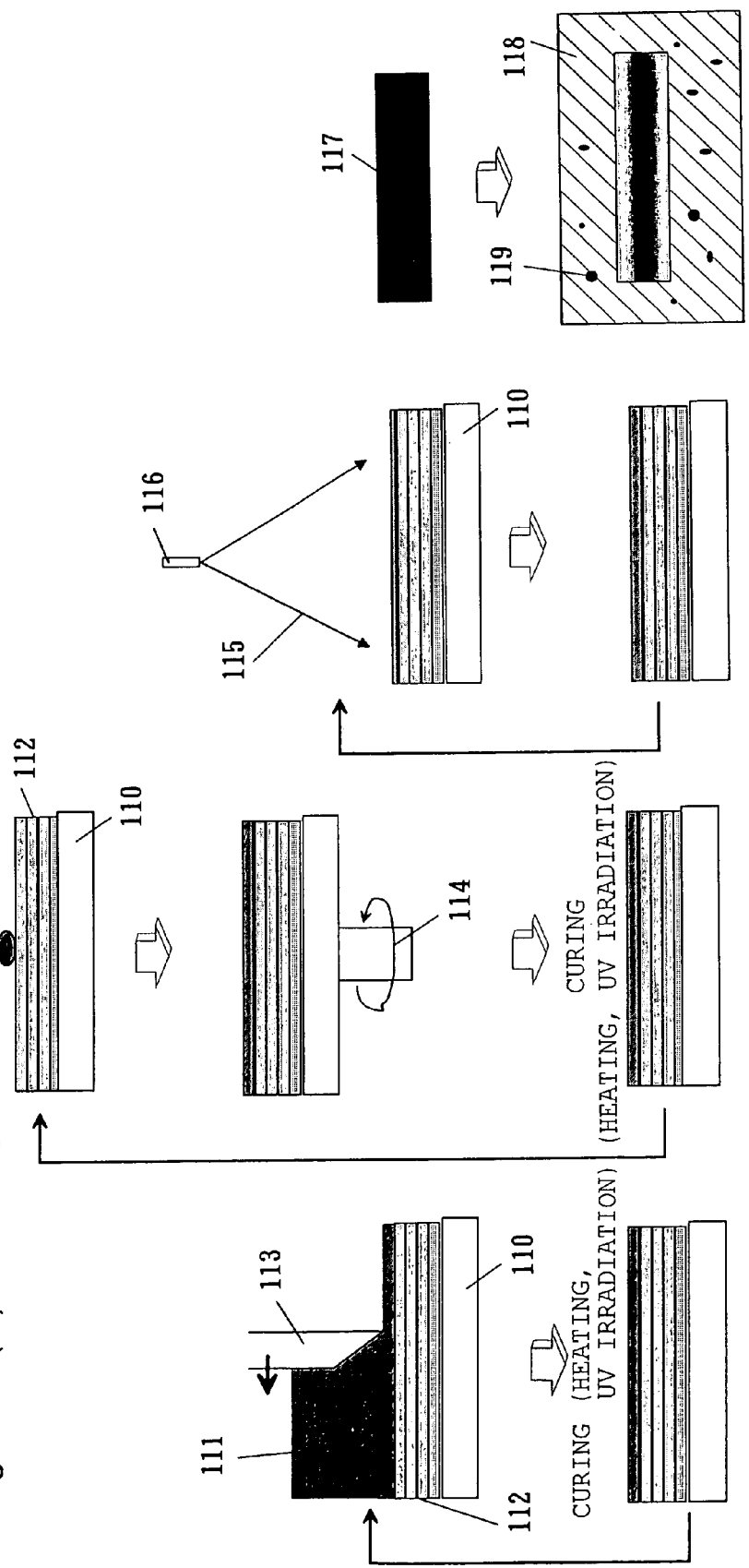
FIGS. 12(a) to 12(d) are diagrams showing the outlines of slab waveguide fabrication methods in seventh to tenth embodiments of the present invention.

FIG. 12(a) shows the outline of a method of fabricating a slab waveguide having a refractive index distribution in the film thickness direction according to the seventh embodiment.

In the method of fabricating a slab waveguide having a refractive index distribution according to this embodiment, an ideal refractive index distribution in the film thickness direction in a desired slab waveguide is first divided into m portions as partial slabs in the film thickness direction, as shown in FIG. 12(a). The refractive index of each of the divided m partial slabs is determined as a value between the maximum and minimum of the distributed values of the refractive index of the partial slabs, e.g., a mean value (the refractive index of the kth partial slab: nk) (k=1 to m), and uncured polymers of a plurality of refractive indices corresponding to the m partial slabs are prepared. Next, the uncured kth polymer 111 (refractive index: nk) is applied on a substrate 110 (in order of k=1, 2, ... m), is spread with a blade 113 so as to form the kth film corresponding to the film thickness of the kth partial slab, and is then cured. The above-described application, spreading and curing of the uncured polymers 111 are repeated from the first film to the mth film to fabricate the slab waveguide having a refractive index distribution in the film thickness direction.

As a method of curing uncured polymers 111, heating or UV irradiation may be performed.

Eighth Embodiment

The eighth embodiment of the present invention will be described.

FIG. 12(b) shows the outline of a method of fabricating a slab waveguide having a refractive index distribution in the film thickness direction according to the eighth embodiment.

In the method of fabricating a slab waveguide having a refractive index distribution according to this embodiment, an ideal refractive index distribution in the film thickness direction in a desired slab waveguide is first divided into m portions as partial slabs in the film thickness direction, as shown in FIG. 12(b). The refractive index of each of the divided m partial slabs is determined as a value between the maximum and minimum of the distributed values of the refractive index of the partial slabs, e.g., a mean value (the refractive index of the kth partial slab: nk) (k=1 to m), and uncured polymers of a plurality of refractive indices corresponding to the m partial slabs are prepared. Next, the uncured kth polymer (refractive index: nk) is applied on a substrate 110 (in order of k=1, 2, ... m), a centrifugal force is applied to the substrate 110 and to the uncured kth polymer on the cured (k−1)th polymer by a spin coater 114 to spread the uncured kth polymer so as to form the kth film having the film thickness corresponding to the film thickness of the kth partial slab after curing, and the uncured kth polymer 111 is thereafter cured. The above-described application, spreading and curing of the uncured polymers 111 are repeated from the first film to the mth film to fabricate the slab waveguide having a refractive index distribution in the film thickness direction.

As a method of curing uncured polymers 111, heating or UV irradiation may be performed.

Ninth Embodiment

The ninth embodiment of the present invention will be described.

FIG. 12(c) shows the outline of a method of fabricating a slab waveguide having a refractive index distribution in the film thickness direction according to the ninth embodiment.

In the method of fabricating a slab waveguide having a refractive index distribution according to this embodiment, an ideal refractive index distribution in the film thickness direction in a desired slab waveguide is first divided into m portions as partial slabs in the film thickness direction, as shown in FIG. 12(c). The refractive index of each of the divided m partial slabs is determined as a value between the maximum and minimum of the distributed values of the refractive index of the partial slabs, e.g., a mean value (the refractive index of the kth partial slab: nk) (k=1 to m), and materials 115 optically transparent and having a plurality of refractive indices corresponding to the m partial slabs are prepared. Next, the kth material (refractive index: nk) is deposited and laminated on a substrate 110 (in order of k=1, 2, ... m) by sputtering or the like so that the film thickness of the kth material is equal to the film thickness of the kth partial slab. The above-described material 115 thin film deposition process is repeated from the first deposited thin film to the mth deposited thin film to fabricate the slab waveguide having a refractive index distribution in the film thickness direction.

The material 115 optically transparent is a material capable of refractive index control, e.g., a polymer, glass, a compound semiconductor, or an oxide (ceramic).

Tenth Embodiment

The tenth embodiment of the present invention will be described.

FIG. 12(d) shows the outline of a method of fabricating a slab waveguide having a refractive index distribution in the film thickness direction according to the tenth embodiment.

In the method of fabricating a slab waveguide having a refractive index distribution according to the embodiment, a uniform-refractive-index slab 117 uniformly having a refractive index corresponding to the maximum refractive index in the desired refractive index distribution is first prepared and immersed in an ionized medium (electrolytic solution) 118 having ions 119 for reducing the refractive index of the uniform-refractive-index slab waveguide, as shown in FIG. 12(d). Ions 119 in the ionized medium (electrolytic solution) 118 enters the uniform-refractive-index slab 117 through the surfaces of the same to replace ions in the uniform-refractive-index slab 117. The amount of ion replacement is reduced along an inward direction from each surface of the uniform-refractive-index slab 117. As a result, from the uniform-refractive-index slab 117 uniform in refractive index, the slab waveguide is formed so as to have a refractive index distribution in which the refractive index is maximized at the center. The refractive index distribution is controlled through ion exchange conditions (including concentration, temperature and time).

The material of the uniform-refractive-index slab 117 is, for example, glass, and ions 119 for reducing the refractive index are, for example, fluorine ions.

The uniform-refractive-index slab 117 in this embodiment is an example of a film-like slab material of the present invention.

For example, a method of providing a refractive index distribution in a sheet of glass by implanting ions in the sheet of glass and by controlling the distribution of the implanted ions in the glass, a method of controlling the refractive index distribution in a sheet of polysilane by controlling the distribution of the oxygen concentration in polysilane at the time of inorganizing setting of polysilane, or a method of controlling the refractive index distribution in a sheet of a full-fluorine resin by controlling the distributions of a high-refractive-index low-molecular-weight component and a low-refractive-index monomer in the full-fluorine resin at the time of setting of the full-fluorine resin may be used. The method of the formation of refractive index distribution in the full-fluorine resin may be used in the case of using some other resin.

However, the above-mentioned polysilane changes into a siloxane structure of a lower refractive index by oxidation at the time of setting caused by UV exposure or a heat treatment, so that the refractive index is changed according to the proportions of the polysilane structure portion not oxidized and the siloxane structure portion generated by oxidation. In a case where oxidation by oxygen in atmosphere is caused, the oxygen concentration in the sheet of polysilane decreases along a direction from the surface to an inner portion and, therefore, a refractive index portion in which the refractive index is reduced from an inner portion to the surface at which the oxygen concentration is high is spontaneously formed. Further, the oxygen concentration in the sheet of polysilane can be controlled by the oxygen pressure. Also, oxygen or an oxide other than oxygen in atmosphere may be diffused in a desired distribution in the sheet of polysilane before setting to control the refractive index distribution at the time of oxidation as desired. Also, a refractive index distribution symmetric about a center in the thickness direction can be formed by oxidizing the sheet of polysilane symmetrically from the two surfaces. In the case of setting by UV exposure from the substrate side, a material transparent to UV, e.g., glass such as quartz or Pyrex is used. If exposure is not effected on the substrate side, a material not transparent to UV, e.g., silicon or a resin other than glass may be used.

Eleventh Embodiment

The eleventh embodiment of the present invention will be described.

Figure 13:
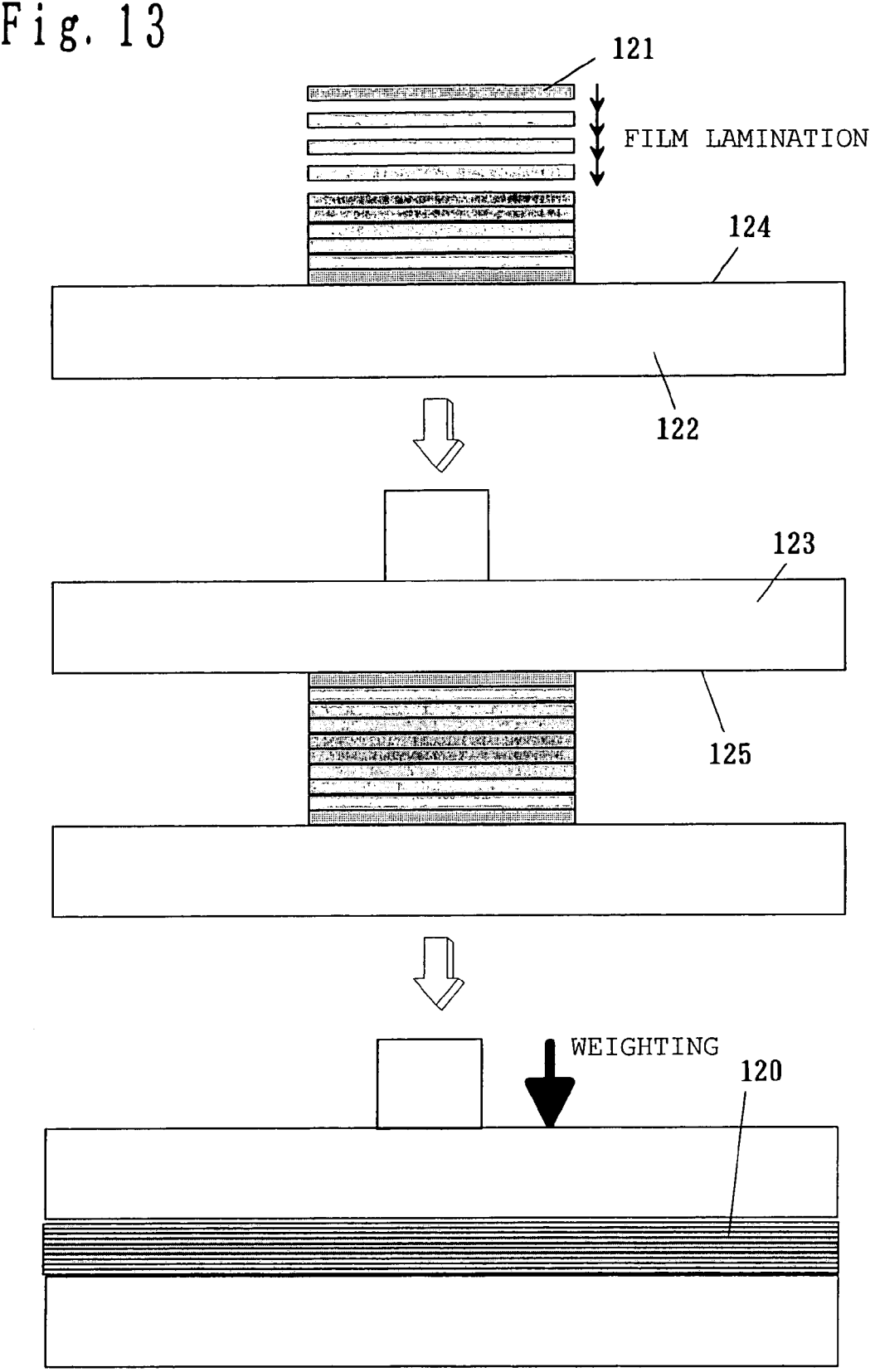
FIG. 13 is a diagram showing the outline of a slab waveguide fabrication method in an eleventh embodiment of the present invention.

FIG. 13 shows the outline of a method of fabricating a slab waveguide having a refractive index distribution in the film thickness direction according to the eleventh embodiment.

In the method of fabricating a slab waveguide having a refractive index distribution according to this embodiment, an ideal refractive index distribution in the film thickness direction in a desired slab waveguide 120 is divided into m portions as partial slabs in the film thickness direction, as shown in FIG. 13. The refractive index of each of the divided m partial slabs is determined as a value between the maximum and minimum of the distributed values of the refractive index of the partial slabs, e.g., a mean value (the refractive index of the kth partial slab: nk) (k=1 to m), and m thick films 121 (first to mth thick films) having refractive indices corresponding to the m partial slabs are prepared. The above-described thick films are successively laminated from the first to the mth films on a flat surface 124 of a base 122, and the laminated thick films are pinched between the flat surface 124 of the base and a flat surface 125 of a pressing member 123 having the surface 125 placed parallel to the surface 124 to weight down the thick films until the film thickness of the laminated thick films becomes equal to the desired film thickness of the slab waveguide 120. At this time, the laminated thick films may be heated to facilitate working.

This method of pressing a slab having a refractive index distribution in a similitude relationship with a slab waveguide having a desired refractive index distribution enables an optical member on the order of micrometers to be easily fabricated.

Twelfth Embodiment

The twelfth embodiment of the present invention will be described.

FIG. 14 shows the outline of a method of fabricating a slab waveguide according to the twelfth embodiment, which has a refractive index distribution in the film thickness direction, in which the film thickness changes along a certain direction, and in which the refractive index distribution changes in proportion to the distributed film thickness.

In the method of fabricating a slab waveguide having a refractive index distribution in the film thickness direction according to this embodiment, an ideal refractive index distribution in the film thickness direction in a slab waveguide 130 in which the film thickness changes along a certain direction and the refractive index distribution changes in proportion to the distributed film thickness is divided into m portions as partial slabs, as shown in FIG. 14. The refractive index of each of the divided m partial slabs is determined as a value between the maximum and minimum of the distributed values of the refractive index of the partial slabs, e.g., a mean value (the refractive index of the kth partial slab: nk) (k=1 to m), and m thick films 131 (first to mth thick films) having refractive indices corresponding to them partial slabs are prepared. The above-described thick films are successively laminated from the first to the mth films on a flat surface 134 of a base 132, and the laminated thick films are pinched between the flat surface 134 of the base and a surface 135 of a pressing member 133 formed in such a manner that distance from the flat surface 134 changes monotonously according to the change in film thickness of the slab waveguide 130. The thick films are thereby weighted down until the film thickness of the thick films becomes equal to the desired film thickness of the slab waveguide 130. At this time, the laminated thick films may be heated to facilitate working.

This method of pressing a slab having a refractive index distribution in a similitude relationship with a slab waveguide having a desired refractive index distribution enables an optical member on the order of micrometers to be easily fabricated.

The slab waveguide which has a refractive index distribution in the film thickness direction, in which the film thickness changes along a certain direction, and in which the refractive index distribution changes in proportion to the distributed film thickness, has different mode fields at ends 136 and 137, the film thickness at the end 136 being larger, the film thickness at the end 137 being smaller. Therefore, this slab waveguide can be used as a mode converter. Further, if the width 138 in the direction perpendicular to the thickness direction of the slab waveguide 130 and to the optical axis connecting the end 136 at which the film thickness is larger and the end 137 at which the film thickness is smaller is set to such a value as to satisfy a single mode condition, the mode converter can be used as a single-mode mode converter.

Thirteenth Embodiment

The thirteenth embodiment of the present invention will be described.

Figure 15:
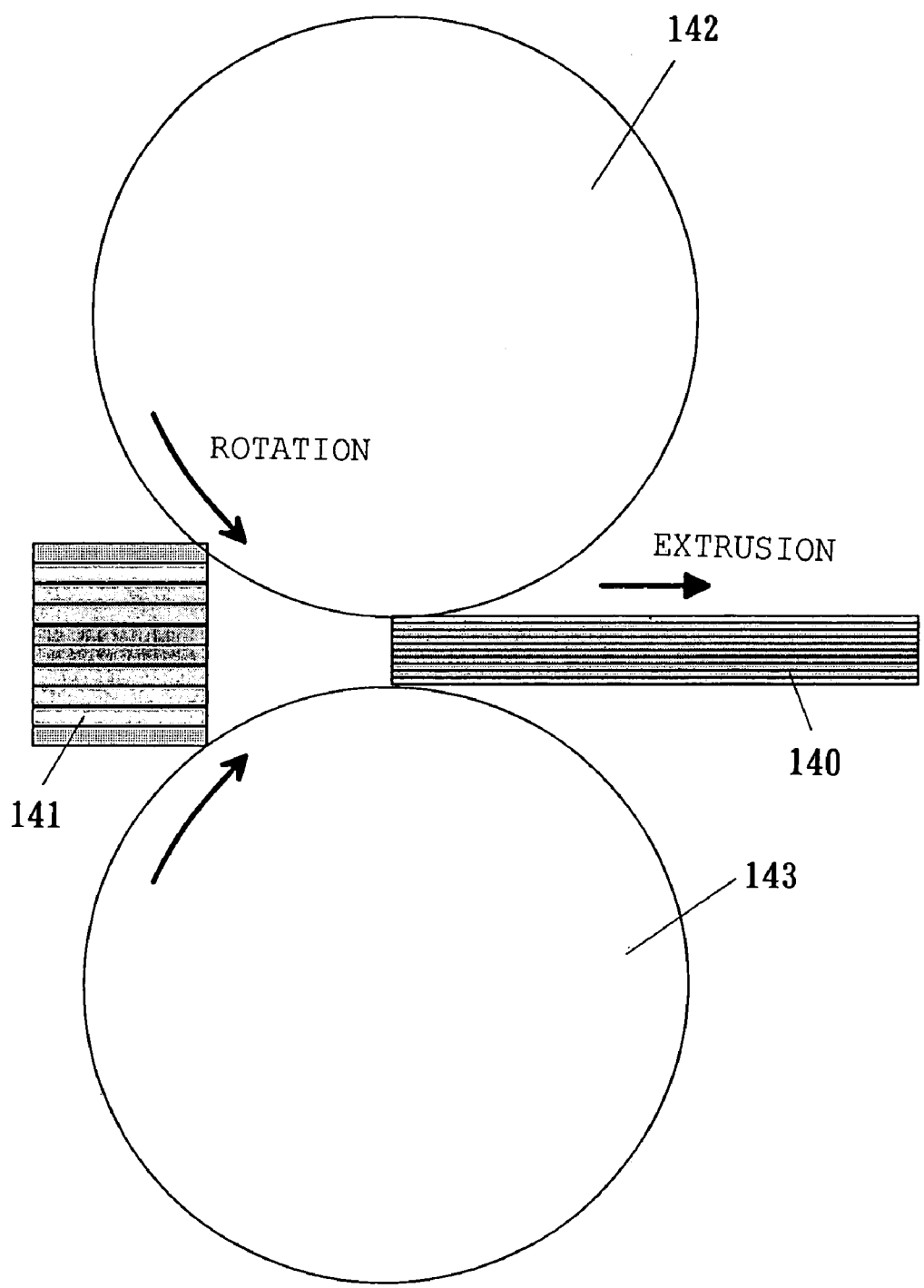
FIG. 15 is a diagram showing the outline of a slab waveguide fabrication method in a thirteenth embodiment of the present invention.

FIG. 15 shows the outline of a method of fabricating a slab waveguide having a refractive index distribution in the film thickness direction according to the thirteenth embodiment.

In the method of fabricating a slab waveguide having a refractive index distribution according to this embodiment, an ideal refractive index distribution in the film thickness direction in a desired slab waveguide 140 is divided into m portions as partial slabs in the film thickness direction, as shown in FIG. 15. The refractive index of each of the divided m partial slabs is determined as a value between the maximum and minimum of the distributed values of the refractive index of the partial slabs, e.g., a mean value (the refractive index of the kth partial slab: nk) (k=1 to m), and m thick films 141 (first to mth thick films) having refractive indices corresponding to the m partial slabs are prepared. Next, a multilayer thick film formed by successively laminating the above-described thick films from the first to mth film is inserted between a pair of rollers (142 and 143) opposed to each other, having a spacing equal to the film thickness of the slab waveguide 140, and rotated in opposite directions, the multilayer thick film being inserted along the directions of rotation of the rollers. The inserted multilayer thick film is rolled by the pair of rollers (142 and 143) until its thickness is reduced to the film thickness of the slab waveguide 140. At this time, the multilayer thick film may be heated to facilitate working.

The arrangement may alternatively be such that the multilayer thick film is drawn (rolled) by rolling a roller (not shown) on the multilayer thick film placed on a flat surface (not shown) while applying a weight to the thick film.

The above-described rolling process may be divided into a plurality of steps successively performed to gradually reduce the thickness of the multilayer thick film.

This method of pressing a slab having a refractive index distribution in a similitude relationship with a slab waveguide having a desired refractive index distribution enables an optical member on the order of micrometers to be easily fabricated.

Fourteenth Embodiment

The fourteenth embodiment of the present invention will be described.

Figure 16:
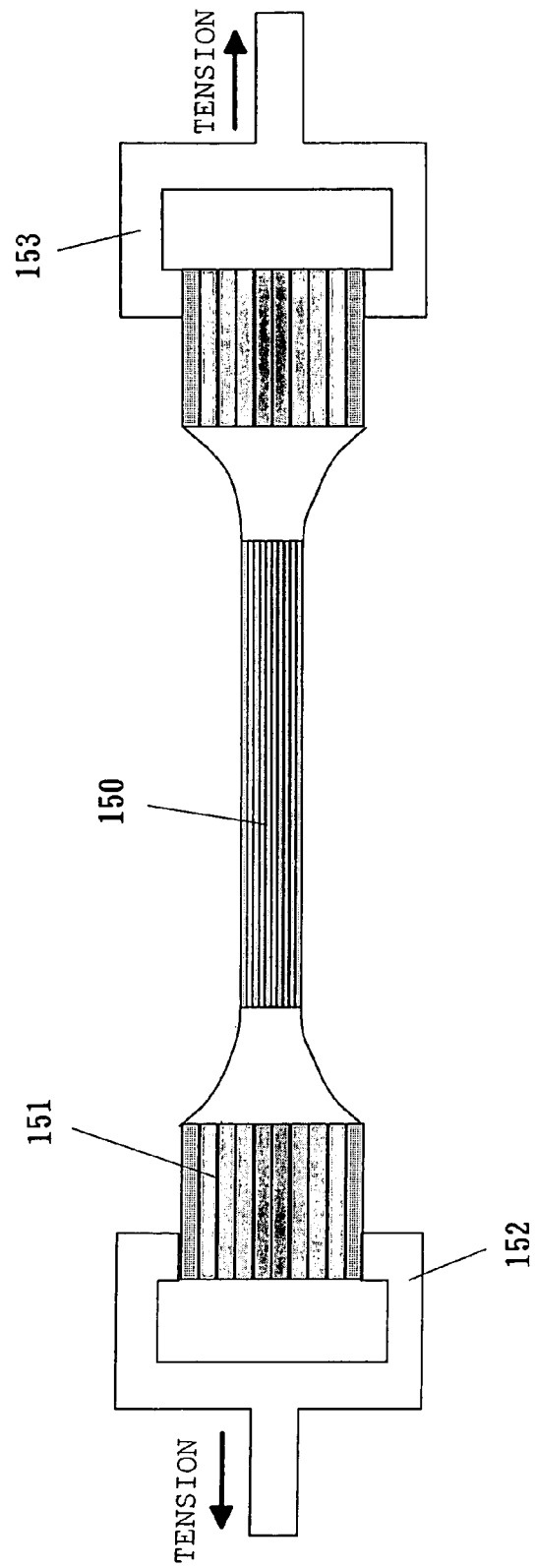
FIG. 16 is a diagram showing the outline of a slab waveguide fabrication method in a fourteenth embodiment of the present invention.

FIG. 16 shows the outline of a method of fabricating a slab waveguide having a refractive index distribution in the film thickness direction according to the fourteenth embodiment.

In the method of fabricating a slab waveguide having a refractive index distribution according to this embodiment, an ideal refractive index distribution in the film thickness direction in a desired slab waveguide 150 is divided into m portions as partial slabs in the film thickness direction, as shown in FIG. 16. The refractive index of each of the divided m partial slabs is determined as a value between the maximum and minimum of the distributed values of the refractive index of the partial slabs, e.g., a mean value (the refractive index of the kth partial slab: nk) (k=1 to m), and a thick multilayer film 151 (first to mth thick films) having refractive indices corresponding to the m partial slabs is prepared. Next, opposite ends of the thick multilayer film 151 are held by jigs (152 and 153) and the jigs (152 and 153) are removed relatively away from each other to apply an outward tensile force to the thick multilayer film parallel to the surfaces of the film, thereby reducing the film thickness of the thick multilayer film 151 to the thickness of the slab waveguide 150. At this time, the thick multilayer film may be heated to facilitate working.

The above-described tensile process may be divided into a plurality of steps successively performed to gradually reduce the thickness of the thick multilayer film.

This method of pressing a slab having a refractive index distribution in a similitude relationship with a slab waveguide having a desired refractive index distribution enables an optical member on the order of micrometers to be easily fabricated.

Fifteenth Embodiment

A fifteenth embodiment of the present invention will be described.

FIG. 18(a), 18(b), and 18(c) schematically show the slab waveguides each having a refractive index distribution in the thickness direction in the fifteenth embodiment.

As shown in FIGS. 18(a), 18(b), or 18(c), each of slab waveguides having a refractive index distribution in the thickness direction in the fifteenth embodiment is constituted by a refractive index distributed slab waveguide 170 having a maximum-refractive-index portion about a center in the thickness direction, and reduced-refractive-index portions in which the refractive index decreases in accordance with a quadratic curve along an outward direction from the maximum-refractive-index portion, and a diffusing surface 171 which diffuses incident light in the refractive index distributed slab waveguide 170. Methods of coupling of incident light 174 and emergent light 175 to the refractive index distributed slab waveguide 170 are essentially divided into three kinds respectively shown in FIGS. 18(a), 18(b), and 18(c).

(1) Linear-Type Multicast

As shown in FIG. 18(a), an incidence surface 172 and an emergence surface 173 are parallel to the film thickness direction of the refractive index distributed slab waveguide 170, and the incident light diffusing surface 171 is also parallel to the film thickness direction.

In this case, incident light 174 is incident parallel to the refractive index distributed slab waveguide 170 and is uniformly diffused along a direction perpendicular to the film thickness direction of the refractive index distributed slab waveguide 170 at the diffusing surface so that substantially equal amounts of emergent light 175 can be received from the emergence surface at any different positions.

(2) Reflection-Type Multicast

As shown in FIG. 18(b), an incidence surface 177 and an emergence surface 178 are respectively formed as an inclined incidence surface and an inclined emergence surface inclined in opposite directions by 45 degrees from the film thickness direction of the refractive index distributed slab waveguide 170. The incident light diffusing surface 171 is also inclined by 45 degrees, as is the inclined incidence surface 177.

In this case, incident light 174 is incident along the film thickness direction of the refractive index distributed slab waveguide 170 and is reflected by the inclined incidence surface 177 inclined by 45 degree to be coupled to the refractive index distributed slab waveguide 170. The diffusing surface 171 on the inclined incidence surface 177 diffuses the incident light uniformly along a direction perpendicular to the film thickness direction of the refractive index distributed slab waveguide 170. The inclined emergence surface 178 reflects the diffused light so that substantially equal amounts of emergent light 175 can be received from the emergence surface at any different positions.

(3) Coupler-Type Multicast

As shown in FIG. 18(c), a prism coupler 179 is provided in the vicinity of each of incidence and emergence surfaces parallel to the film thickness direction of the refractive index distributed slab waveguide 170, and the diffusing surface is in the film thickness direction, as is the incidence surface.

In this case, incident light 174 is incident on the prism coupler 179 in a direction inclined from the film thickness direction of the refractive index distributed slab waveguide 170 to be coupled to the refractive index distributed slab waveguide 170. The diffusing surface on the incidence surface diffuses the incident light uniformly along a direction perpendicular to the film thickness direction of the refractive index distributed slab waveguide 170 so that, through the other prism coupler 179 coupled to the refractive index distributed slab waveguide 170, substantially equal amounts of emergent light 175 can be received from the emergence surface at any different positions.

If a plurality of light receiving elements (not shown) are provided on the emergence surface, one optical input signal can be distributed to a plurality of received signals.

The refractive index is reduced at a position remoter from the center because of the reduced-refractive-index portions of the refractive index distributed slab waveguide 170 in accordance with the quadratic curve. Therefore, light in a higher-order mode at a position remoter from the center propagates at a higher speed, while light in a lower-order mode at a position closer to the center propagates at a lower speed. Thus, constant-speed propagation (modal non-dispersion) from the lower-order mode to the higher-order mode, i.e., propagation similar to single-mode propagation can be achieved and high-speed optical communication can be performed in comparison with communication by the slab waveguide in which the refractive index is constant.

A plurality of the above-described incidence surfaces each having a diffusion surface and a plurality of the corresponding emergence surfaces may exist in one refractive index distributed slab waveguide 170. Also, there is no problem with an arrangement in which different methods of coupling of incident light to the refractive index distributed slab waveguide 170 are mixedly used.

Sixteenth Embodiment

A sixteenth embodiment of the present invention will be described.

Figure 19A:
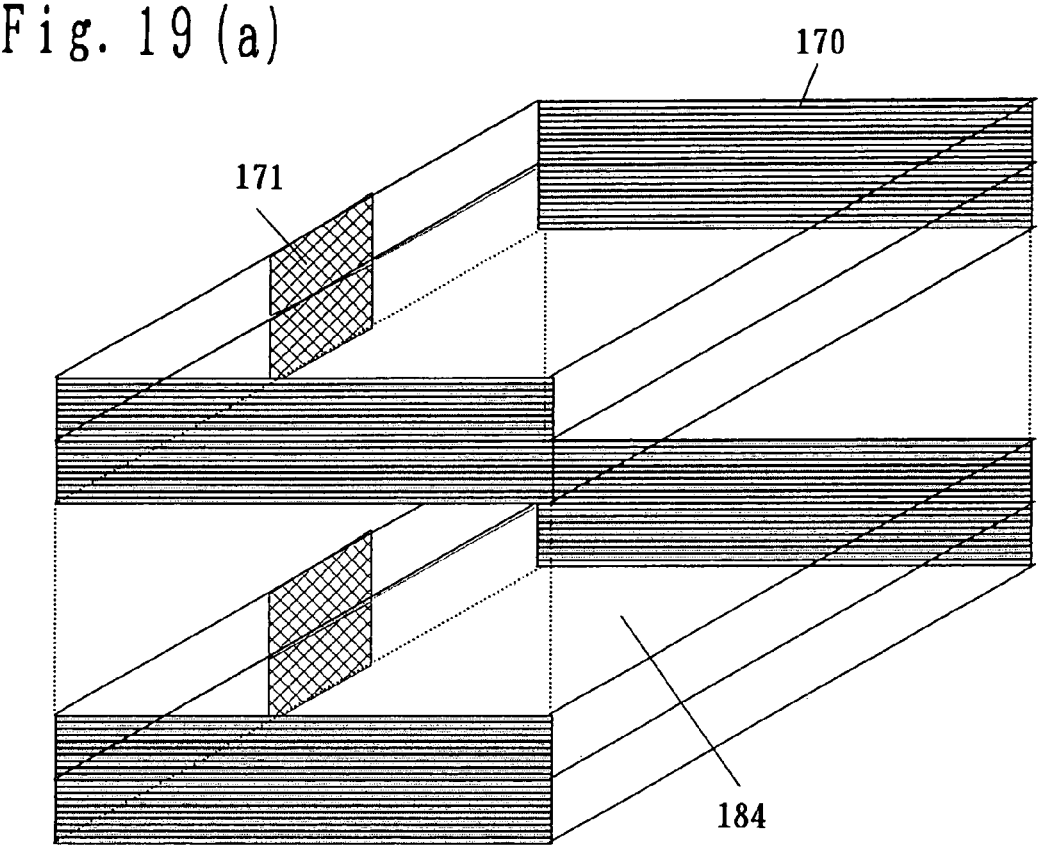
FIGS. 19(a) and 19(b) are diagrams schematically showing slab waveguides in a sixteenth embodiment of the present invention.

FIG. 19(a) schematically shows a slab waveguide having a refractive index distribution in the thickness direction in the sixteenth embodiment.

The slab waveguide having a refractive index distribution in the thickness direction according to this embodiment is constructed in such a manner that, as shown in FIG. 19(a), slab waveguides each constituted by a refractive index distributed slab waveguide 170 having a maximum-refractive-index portion about a center in the thickness direction, and reduced-refractive-index portions in which the refractive index decreases in accordance with a quadratic curve along an outward direction from the maximum-refractive-index portion, and a diffusing surface 171 which diffuses incident light in the refractive index distributed slab waveguide 170 are stacked in the film thickness direction with the diffusing surfaces facing in the same direction.

Thus, if a multilayer refractive index distributed slab waveguide 184 in which the a plurality of above-described refractive index distributed slab waveguide 170 are provided in multiple layers is used, passive alignment of the multilayer refractive index distributed slab waveguide 184 with an input unit (not shown) in which a plurality of incident beams are bundled (optical coupling with mechanical precision achieved by using a fixing portion) can be achieved at a time. Also on the output side, passive alignment of the multilayer refractive index distributed slab waveguide 184 with a light receiving unit (not shown) in which a plurality of light receiving units are combined can be achieved.

Seventeenth Embodiment

A seventeenth embodiment of the present invention will be described.

Figure 19B:
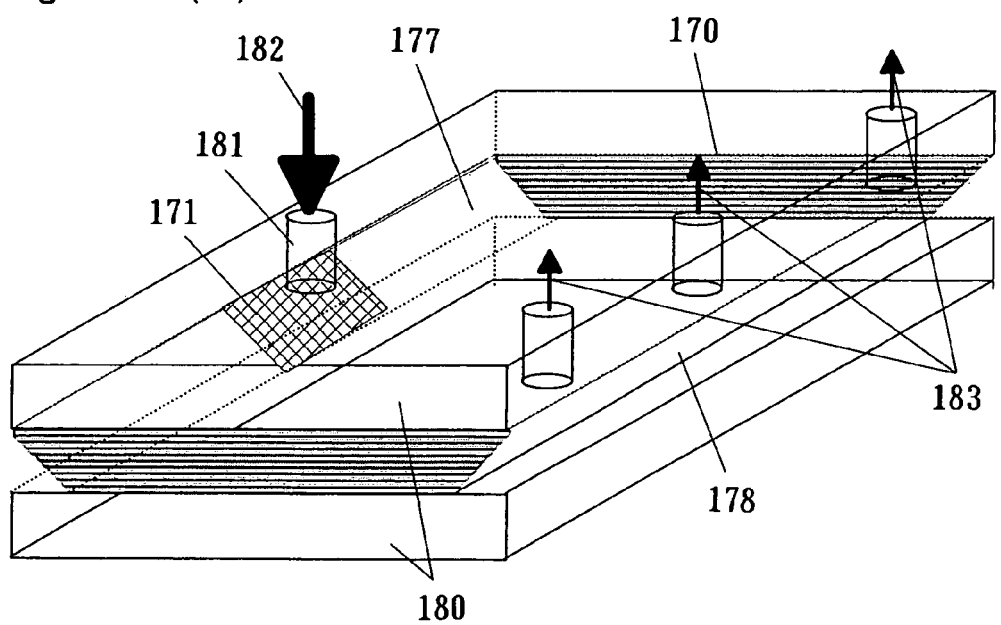

FIG. 19(*b*) schematically shows a slab waveguide having a refractive index distribution in the thickness direction in the seventeenth embodiment.

The slab waveguide having a refractive index distribution in the thickness direction according to this embodiment is constructed in such a manner that, as shown in FIG. 19(*b*), the reflection-type multicast refractive index distributed slab waveguide (2) in the fifteenth embodiment and a electric insulating substrate 180 such as a printed circuit board are stacked. In the electric insulating substrate 180, through holes 181 are formed in portions through which incident light 182 and emergent light 183 pass in the film thickness direction of the refractive index distributed slab waveguide 170, thereby enabling coupling of incident light 182 and emergent light 183 to the reflection-type multicast refractive index distributed slab waveguide.

Thus, if a hybrid waveguide formed by combining the refractive index distributed slab waveguide 170 and the electric insulating substrate 180 in a multilayer structure as described above is used, the facility with which the electric circuit and the optical circuit are mounted can be improved and a reduction in overall size can also be achieved.

The electric insulating substrate 180 comprising a printed circuit board may be a multilayer printed circuit board mounted in a three-dimensional electrical mounting manner.

The arrangements described in this specification in the various aspects of the present invention are in relationships described below.

According to the first aspect of the present invention, a slab waveguide is provided which comprises a two-dimensional crystal grating having columnar members having a refractive index different from the refractive index of a slab and two-dimensionally and periodically arranged along a surface of the slab, wherein the refractive index of a slab refractive index portion other than the columnar members in the slab, the number, the shape and the refractive index of the columnar members in the slab are selected so that when a beam of light entering the waveguide expands to a maximum extent, the size of the beam in the slab thickness direction does not exceed the slab thickness.

According to the second aspect of the present invention, in the slab waveguide in the first aspect of the invention, wherein the refractive index of said slab refractive index portion in a direction perpendicular to the slab surface is maximized at a predetermined portion other than end portions in the slab refractive index portion, and is not increased with the increase in distance from the predetermined portion.

According to the third aspect of the present invention, in the slab waveguide in the second aspect of the invention, wherein the refractive index of said slab refractive index portion in the direction perpendicular to the slab surface is distributed symmetrically about the predetermined portion.

According to the fourth aspect of the present invention, in the slab waveguide in the third aspect of the invention, the slab waveguide, wherein the refractive index of said slab refractive index portion in the direction perpendicular to the slab surface is reduced in accordance with a quadratic function or a approximately quadratic function of the distance from the predetermined portion.

According to the fifth aspect of the present invention, in the slab waveguide in the third aspect of the invention, the slab waveguide, wherein the predetermined portion is a region of a predetermined length other than the end portions in said slab refractive index portion, and the refractive index of said slab refractive index portion in the direction perpendicular to the slab surface is substantially constant in the region having the predetermined length other than the end portions in said slab refractive index portion and is reduced in accordance with a quadratic function or a approximately quadratic function of the distance from an end of the region having the predetermined length.

According to the sixth aspect of the present invention, in the slab waveguide in the fourth or fifth aspect of the invention, a refractive index distribution constant relating to the refractive index of the portion in which the refractive index is reduced in accordance with the quadratic function or the approximately quadratic function of the distance is about 1 $mm^{-1}$ or greater.

According to the seventh aspect of the present invention, in the slab waveguide in the fourth or fifth aspect of the invention, the columnar member is a gas uniform in refractive index.

According to the eight aspect of the present invention, in the slab waveguide in the fourth or fifth aspect of the invention, a refractive index distribution constant relating to the refractive index of the portion in which the refractive index is reduced in accordance with the quadratic function or the approximately quadratic function of the distance is such a value that the total optical path length is defined by an optical integer multiple pitch of about 0.5.

According to the ninth aspect of the present invention, in the slab waveguide in the fourth or fifth aspect of the invention, a refractive index distribution constant relating to the refractive index of the portion in which the refractive index is reduced in accordance with the quadratic function or the approximately quadratic function of the distance is such a value that the sum of an incidence-side focal distance and an emergence-side focal distance of the slab refractive index portion is equal to the length of a constituent unit formed by the slab refractive index portion and the columnar members.

According to the tenth aspect of the present invention, in the slab waveguide in the ninth aspect of the invention, the refractive index distribution constant relating to the refractive index of the portion in which the refractive index is reduced in accordance with the quadratic function or the approximately quadratic function of the distance is such a value that the incidence-side focal distance and the emergence-side focal distance of the slab refractive index portion are equal to each other.

According to the eleventh aspect of the present invention, in the slab waveguide in the fourth or fifth aspect of the invention, at least one of an input end surface of the slab refractive index portion, which is a light input end surface, and an output end surface of the slab refractive index portion, which is a light output end surface, in a plurality of portions in the slab refractive index portion has a curved surface.

According to the twelfth aspect of the present invention, in the slab waveguide in the fourth or fifth aspect of the invention, at least one of an input end surface of the slab refractive index portion, which is a light input end surface, and an output end surface of the slab refractive index portion, which is a light output end surface, in a plurality of portions in the slab refractive index portion has a predetermined flat surface other than end portions of the slab refractive index portion, and has a curved surface outside the flat surface.

According to the thirteenth aspect of the present invention, in the slab waveguide in the eleventh or twelfth aspect of the invention, the curved surface has a radius of curvature of about 1 μm or greater.

According to the fourteenth aspect of the present invention, in the slab waveguide in the eleventh or twelfth aspect of the invention, the curved surface has a radius of curvature of about 1/10 μm or greater of the total number of periods if a constituent unit formed by the slab refractive index portion and the columnar members is one period.

According to the fifteenth aspect of the present invention, in the slab waveguide in the first aspect of the invention, at least one of boundary surfaces between the slab refractive index portion and the columnar members has a curved surface.

According to the sixteenth aspect of the present invention, in the slab waveguide in the fifteenth aspect of the invention, the boundary surface between the slab refractive index portion and the columnar members has a curved surface in the thickness direction of the slab.

According to the seventeenth aspect of the present invention, in the slab waveguide in the fifteenth aspect of the invention, the boundary surface between the slab refractive index portion and the columnar members has a flat surface in a region having a predetermined length other than end portions in the slab refractive index portion, and has curved surfaces in the film thickness direction of the slab outside the region having a predetermined length.

According to the eighteenth aspect of the present invention, in the slab waveguide in the sixteenth or seventeenth aspect of the invention, the radius of curvature of the curved surface is such a value that the sum of an incidence-side focal distance and an emergence-side focal distance of the slab refractive index portion is equal to the length of a constituent unit formed by the slab refractive index portion and the columnar members.

According to the nineteenth aspect of the present invention, in the slab waveguide in the eighteenth aspect of the invention, the radius of curvature of the curved surface is such a value that the sum of an incidence-side focal distance and an emergence-side focal distance of the slab refractive index portion are equal to each other.

According to the twentieth aspect of the present invention, in the slab waveguide in the sixteenth or seventeenth aspect of the invention, the radius of curvature of the curved surface is about 0.1 μm or greater.

According to the twenty-first aspect of the present invention, in the slab waveguide in any one of the first to twentieth aspects of the invention, a film-like member is provided on at least one of surfaces of the slab so as to contact the slab surface.

According to the twenty-second aspect of the present invention, in the slab waveguide in any one of the fourth, fifth, sixteenth, and seventeenth aspects of the invention, at least one incident light diffusing portion is provided in an incident light incidence surface.

According to the twenty-third aspect of the present invention, in the slab waveguide in the twenty-second aspect of the invention, the incident light diffusing portion is provided in a surface by which incident light is first reflected.

According to the twenty-fourth aspect of the present invention, a slab waveguide is provided in which a plurality of the slab waveguides in the twenty-second aspect of the invention are stacked in the film thickness direction.

According to the twenty-fifth aspect of the present invention, a slab waveguide is provided which has an electrical substrate and the slab waveguide in the twenty-second aspect of the invention stacked on the electrical substrate in the film thickness direction.

According to the twenty-sixth aspect of the present invention, in the slab waveguide in the twenty-fifth aspect of the invention, a through hole for passage of at least one of incident light and emergent light is formed in the electrical substrate.

According to the twenty-seventh aspect of the present invention, a method of manufacturing a slab waveguide is provided which comprises a lamination step of forming a laminate by laminating a plurality of films differing in refractive index from each other and each having holes formed therein, while aligning the holes of the films, wherein a film portion of the laminate functions as a slab, and each of portions corresponding to the holes in the films functions as a columnar member.

According to the twenty-eighth aspect of the present invention, in the slab waveguide manufacturing method in the twenty-seventh aspect of the invention, one of the films having the highest refractive index is placed at a position other than end portions of the laminate, and the other films are successively laminated outwardly from the position of the film having the highest refractive index in decreasing order of refractive index to form the laminate.

According to the twenty-ninth aspect of the present invention, in the slab waveguide manufacturing method in the twenty-seventh aspect of the invention, the lamination step includes irradiating a surface of each of the plurality of films with single-wavelength light applied perpendicular to the surface of the film when the film is laminated on the laminate, and aligning the positions of the holes of the films in the film thickness direction by positioning the laminated film on the basis of interference light from the laminate.

According to the thirtieth aspect of the present invention, in the slab waveguide manufacturing method in the twenty-seventh aspect of the invention, a plurality of positioning pins thinner than the holes are stood in correspondence with the positions of the holes of the films, and the plurality of films are laminated while aligning the positions of the holes of the films in the film thickness direction by using the positioning pins.

According to the thirty-first aspect of the present invention, in the slab waveguide manufacturing method in the twenty-seventh aspect of the invention, the holes are formed in such a manner that a die having columnar projections periodically arranged on its surface is pressed against the films and is removed from the films.

According to the thirty-second aspect of the present invention, a method of manufacturing a slab waveguide is provided which comprises:

a lamination step of forming a laminate by laminating a plurality of films differing in refractive index from each other; and a columnar member forming step of forming holes in the laminate formed in the lamination step, wherein a film portion of the laminate functions as a slab, and each of portions corresponding to the holes in the films functions as a columnar member.

According to the thirty-third aspect of the present invention, in the slab waveguide manufacturing method in the thirty-second aspect of the invention, the columnar member forming step includes forming the holes by pressing against the laminate a die having columnar projections periodically arranged on its surface, and by removing the pressed die from the laminate.

According to the thirty-fourth aspect of the present invention, in the slab waveguide manufacturing method in the thirty-second aspect of the invention, the columnar member forming step includes a tracking step of implanting ions while superposing a mask having holes periodically arranged on a film surface of the laminate, and an etching step of immersing the laminated implanted with ions in an etching solution.

According to the thirty-fifth aspect of the present invention, in the slab waveguide manufacturing method in the thirty-second aspect of the invention, the lamination step includes repeating three steps: a step of applying an uncured polymer, a step of spreading the uncured polymer, and a step of curing the spread uncured polymer.

According to the thirty-sixth aspect of the present invention, in the slab waveguide manufacturing method in the thirty-second aspect of the invention, the lamination step includes repeating a step of depositing a thin film of a lamination material.

According to the thirty-seventh aspect of the present invention, in the slab waveguide manufacturing method in the thirty-second aspect of the invention, the lamination step includes:

a thick film laminate forming step of forming a refractive index distributed thick film laminate by laminating thick films differing in refractive index from each other in such a manner that the refractive index is maximized in a portion other than end portions of the laminate; and a pressing step of pressing the refractive index distributed thick film laminate in the direction of lamination until the thickness of the refractive index distributed thick film laminate becomes equal to a desired thickness.

According to the thirty-eighth aspect of the present invention, in the slab waveguide manufacturing method in the thirty-seventh aspect of the invention, the pressing step includes weighting down the refractive index distributed thick film laminate by pinching the same between two members having surfaces parallel to each other.

According to the thirty-ninth aspect of the present invention, in the slab waveguide manufacturing method in the thirty-seventh aspect of the invention, the pressing step includes weighting down the refractive index distributed thick film laminate by pinching the same between two members having surfaces which are not parallel to each other at least in a restricted region.

According to the fortieth aspect of the present invention, in the slab waveguide manufacturing method in the thirty-ninth aspect of the invention, the two members comprise a first member having a horizontal flat surface, and a second member having a flat surface or a curved surface such that the distance from the flat surface of the first member changes monotonously with respect to a direction parallel to the flat surface of the first member.

According to the forty-first aspect of the present invention, in the slab waveguide manufacturing method in the thirty-seventh aspect of the invention, the pressing step includes reducing the film thickness of the refractive index distributed thick film laminate to the thickness of the slab waveguide in such a manner that the refractive index distributed thick film laminate is dragged in between two members between which the minimum spacing is substantially equal to the film thickness of the slab waveguide, which have surfaces parallel to each other at the position corresponding to the minimum spacing, and at least one of which is a roller, the refractive index distributed thick film laminate being dragged in by applying a force thereto from the roller in a rotating state.

According to the forty-second aspect of the present invention, in the slab waveguide manufacturing method in the thirty-seventh aspect of the invention, the pressing step includes reducing the film thickness of the refractive index distributed thick film laminate to the thickness of the slab waveguide in such a manner that the refractive index distributed thick film laminate is fixed on a surface of one of two members between which the minimum spacing is substantially equal to the film thickness of the slab waveguide, which have surfaces parallel to each other at the position corresponding to the minimum spacing, and at least one of which is a roller, and the roller is rolled on the refractive index distributed thick film laminate.

According to the forty-third aspect of the present invention, in the slab waveguide manufacturing method in the thirty-seventh aspect of the invention, the pressing step includes reducing the film thickness of the refractive index distributed thick film laminate to the thickness of the slab waveguide in such a manner that a tensile force is applied to the refractive index distributed thick film laminate at least at two points at ends of the same, the tensile force being outwardly applied in a direction parallel to the refractive index distributed thick film laminate.

According to the forty-fourth aspect of the present invention, in the slab waveguide manufacturing method in any one of the twenty-seventh to forty-third aspects of the invention, the refractive index distributed thick film laminate is heated in the pressing step.

According to the forty-fifth aspect of the present invention, a method of manufacturing a slab waveguide is provided which comprises:

a refractive index distribution forming step of forming a refractive index distribution in a film-like slab blank by causing ions to move into and out of the film-like slab blank through upper and lower surfaces of the film-like slab blank; and a columnar member forming step of forming holes in the film-like slab blank in which the refractive index distribution is formed, wherein a portion of the film-like slab blank functions as a slab, and each of portions corresponding to the holes functions as a columnar member.

As is apparent from the foregoing, the present invention can provide a slab waveguide having substantially no coupling loss in coupling to an optical fiber and capable of satisfying single mode conditions, and a method of manufacturing the slab waveguide.

What is claimed is:

1. A slab waveguide comprising a two-dimensional crystal grating having columnar members having a refractive index different from the refractive index of a slab and two-dimensionally and periodically arranged along a surface of the slab, wherein the refractive index of a slab refractive index portion other than said columnar members in the slab, the number, the shape and the refractive index of said columnar members in the slab are selected so that when a beam of light entering the slab waveguide and traveling periodically, said columnar members and said slab refractive index portion other than said columnar members expands to a maximum extent, the size of the beam in the slab thickness direction does not exceed the slab thickness, wherein the refractive index of said slab refractive index portion in a direction perpendicular to the slab surface is maximized at a predetermined point other than end portions in the slab refractive index portion, and is decreased with the increase in distance from the predetermined point, and wherein the refractive index of said slab refractive index portion in the direction perpendicular to the slab surface is distributed symmetrically about the predetermined point.

2. The slab waveguide according to claim 1, wherein the refractive index of said slab refractive index portion in the direction perpendicular to the slab surface is reduced in accordance with a quadratic function or a approximately quadratic function of the distance from the predetermined point.

3. The slab waveguide according to claim 2, wherein a refractive index distribution constant relating to the refractive index of the portion in which the refractive index is reduced in accordance with the quadratic function or the approximately quadratic function of the distance is about 1 mm$^{-1}$ or greater.

4. The slab waveguide according to claim 2, wherein a refractive index distribution constant relating to the refractive index of the portion in which the refractive index is reduced in accordance with the quadratic function or the approximately quadratic function of the distance is such a value that the total optical path length is defined by an optical integer multiple pitch of about 0.5.

5. The slab waveguide according to claim 2, wherein a refractive index distribution constant relating to the refractive index of the portion in which the refractive index is reduced in accordance with the quadratic function or the approximately quadratic function of the distance is such a value that the sum of an incidence-side focal distance and an emergence-side focal distance of said slab refractive index portion is equal to the length of a constituent unit formed by said slab refractive index portion and said columnar members.

6. A slab waveguide comprising a two-dimensional crystal grating having columnar members having a refractive index different from the refractive index of a slab and two-dimensionally and periodically arranged along a surface of the slab, wherein the refractive index of a slab refractive index portion other than said columnar members in the slab, the number, the shape and the refractive index of said columnar members in the slab are selected so that when a beam of light entering the slab waveguide expands to a maximum extent, the size of the beam in the slab thickness direction does not exceed the slab thickness, wherein at least one of boundary surfaces between said slab refractive index portion and said columnar members has a curved surface, and p1 wherein the boundary surface between said slab refractive index portion and said columnar members has a curved surface in the thickness direction of the slab.

7. A slab waveguide comprising a two-dimensional crystal grating having columnar members having a refractive index different from the refractive index of a slab and two-dimensionally and periodically arranged along a surface of the slab, wherein the refractive index of a slab refractive index portion other than said columnar members in the slab, the number, the shape and the refractive index of said columnar members in the slab are selected so that when a beam of light entering the slab waveguide and traveling periodically, said columnar members and said slab refractive index portion other than said columnar members expands to a maximum extent, the size of the beam in the slab thickness direction does not exceed the slab thickness.

wherein the refractive index of said slab refractive index portion in a direction perpendicular to the slab surface is maximized at a predetermined portion other than end portions in the slab refractive index portion, and is not increased with the increase in distance from the predetermined portion, and wherein the refractive index of said slab refractive index portion in the direction perpendicular to the slab surface is distributed symmetrically about the predetermined portion, and wherein at least one of boundary surfaces between said slab refractive index portion and said columnar members has a flat surface in a region having a predetermined length other than end portions in said slab refractive index portion, and has a curved surface in the slab thickness direction of the slab outside the region having a predetermined length.

8. The slab waveguide according to claim 6 or 7, wherein the radius of curvature of the curved surface is such a value that the sum of an incidence-side focal distance and an emergence-side focal distance of said slab refractive index portion is equal to the length of a constituent unit formed by said slab refractive index portion and said columnar members.

9. The slab waveguide according to claim 8, wherein the radius of curvature of the curved surface is such a value that the sum of an incidence-side focal distance and an emergence-side focal distance of said slab refractive index portion are equal to each other.

10. The slab waveguide according to claim 6 or 7, wherein the radius of curvature of the curved surface is about 0.1 µm or greater.

* * * * *

UNITED STATES PATENT AND TRADEMARK OFFICE
CERTIFICATE OF CORRECTION

PATENT NO.         : 7,184,639 B2
APPLICATION NO. : 10/648905
DATED              : February 27, 2007
INVENTOR(S)        : Hidenobu Hamada It is certified that error appears in the above-identified patent and that said Letters Patent is hereby corrected as shown below:

Title Page, Item (56) References Cited, FOREIGN PATENT DOCUMENTS
Change "WO         WO 02/063347 A" to -- WO     02/063347 A --

Title Page, Item (56) References Cited, FOREIGN PATENT DOCUMENTS
Change "WO         WO 02/091051 A" to -- WO     02/091051 A --

Column 32
Line 8, delete "p1"

Signed and Sealed this

Nineteenth Day of June, 2007

JON W. DUDAS
*Director of the United States Patent and Trademark Office*